United States Patent
Nasu et al.

(10) Patent No.: US 10,528,279 B2
(45) Date of Patent: Jan. 7, 2020

(54) STORAGE MANAGEMENT SERVER, METHOD OF CONTROLLING STORAGE MANAGEMENT SERVER, AND COMPUTER SYSTEM

(71) Applicant: Hitachi, Ltd., Chiyoda-ku, Tokyo (JP)

(72) Inventors: Hiroshi Nasu, Tokyo (JP); Tomohiro Kawaguchi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 16/084,808

(22) PCT Filed: Sep. 15, 2016

(86) PCT No.: PCT/JP2016/077290
§ 371 (c)(1),
(2) Date: Sep. 13, 2018

(87) PCT Pub. No.: WO2018/051467
PCT Pub. Date: Mar. 22, 2018

(65) Prior Publication Data
US 2019/0073150 A1  Mar. 7, 2019

(51) Int. Cl.
*G06F 3/06* (2006.01)
*G06F 9/455* (2018.01)

(52) U.S. Cl.
CPC .......... *G06F 3/0631* (2013.01); *G06F 3/0604* (2013.01); *G06F 3/067* (2013.01); *G06F 9/45558* (2013.01); *G06F 2009/45579* (2013.01)

(58) Field of Classification Search
CPC ...... G06F 3/0631; G06F 3/0604; G06F 3/067; G06F 9/45558; G06F 11/20; G06F 9/46; G06F 2009/45579
See application file for complete search history.

(56) References Cited

U.S. PATENT DOCUMENTS

| | | | | |
|---|---|---|---|---|
| 7,475,280 B1* | 1/2009 | Schlomer et al. | ...... | G06F 11/00 714/5 |
| 8,775,774 B2 | 7/2014 | Desai et al. | | |
| 2004/0010732 A1* | 1/2004 | Oka | .......................... | H04L 1/22 714/13 |
| 2010/0299309 A1* | 11/2010 | Maki et al. | ............. | G06F 12/16 707/640 |

(Continued)

*Primary Examiner* — Larry T Mackall
(74) *Attorney, Agent, or Firm* — Procopio, Cory, Hargreaves & Savitch LLP

(57) ABSTRACT

A storage management server includes a memory storing management information and a management program and a processor executing the management program with reference to the management information, and manages a storage resource allocated to a server resource. The management information includes group mapping information for converting a first parameter of the server resource into a second parameter of the storage resource. The processor receives an operation on the server resource and the first parameter and converts the operation on the server resource into an operation on the storage resource based on preset information. The processor converts the first parameter of the server resource into the second parameter of the storage resource with reference to the group mapping information, specifies the storage resource included in the second parameter, and gives an instruction to operate the storage resource.

12 Claims, 18 Drawing Sheets

(56) References Cited

U.S. PATENT DOCUMENTS

| | | | |
|---|---|---|---|
| 2015/0121134 A1* | 4/2015 | Wipfel et al. | G06F 11/1072 |
| 2016/0098324 A1* | 4/2016 | Sugabrahmam et al. | G06F 11/1435 |
| 2017/0364285 A1* | 12/2017 | Piduri et al. | G06F 3/0619 |

\* cited by examiner

| ACCESS POINT TABLE OF STORAGE 1 | |
|---|---|
| STORAGE ID | IP ADDRESS |
| STG1 | 192.168.60.11 |

| ACCESS POINT TABLE OF STORAGE 2 | |
|---|---|
| STORAGE ID | IP ADDRESS |
| STG2 | 192.168.60.12 |

| REMOTE STORAGE TABLE OF STORAGE 1 | |
|---|---|
| REMOTE STORAGE ID | REMOTE PATH ID |
| STG2 | 0 |

| REMOTE STORAGE TABLE OF STORAGE 2 | |
|---|---|
| REMOTE STORAGE ID | REMOTE PATH ID |
| STG1 | 0 |

| VOLUME TABLE OF STORAGE 1 | | |
|---|---|---|
| VOLUME ID | CAPACITY (GB) | CTG ID |
| STG1.1 | 10 | CTG1 |
| STG1.2 | 20 | CTG1 |
| STG1.3 | 30 | CTG2 |

| VOLUME TABLE OF STORAGE 2 | | |
|---|---|---|
| VOLUME ID | CAPACITY (GB) | CTG ID |
| STG2.1 | 10 | CTG1 |
| STG2.2 | 20 | CTG1 |
| STG2.3 | 30 | CTG2 |

| CONSISTENCY GROUP PAIR TABLE OF STORAGE 1 | | | |
|---|---|---|---|
| CTG ID | Primary/Secondary | REMOTE STORAGE ID | REMOTE CTG ID |
| CTG1 | Primary | STG2 | CTG1 |
| CTG2 | Primary | STG2 | CTG2 |

| CONSISTENCY GROUP PAIR TABLE OF STORAGE 2 | | | |
|---|---|---|---|
| CTG ID | Primary/Secondary | REMOTE STORAGE ID | REMOTE CTG ID |
| CTG1 | Secondary | STG1 | CTG1 |
| CTG2 | Secondary | STG1 | CTG2 |

VOLUME PAIR TABLE OF STORAGE 1 — 225A

| VOLUME ID | PVOL/SVOL | REMOTE VOLUME ID | PAIR STATUS |
|---|---|---|---|
| STG1.1 | PVOL | STG2.1 | SYNC |
| STG1.2 | PVOL | STG2.2 | SYNC |
| STG1.3 | PVOL | STG2.3 | SYNC |

VOLUME PAIR TABLE OF STORAGE 2 — 225B

| VOLUME ID | PVOL/SVOL | REMOTE VOLUME ID | PAIR STATUS |
|---|---|---|---|
| STG2.1 | SVOL | STG1.1 | SYNC |
| STG2.2 | SVOL | STG1.2 | SYNC |
| STG2.3 | SVOL | STG1.3 | SYNC |

ACCESS POINT TABLE OF STORAGE MANAGEMENT SERVER 1 — 321A

| STORAGE MANAGEMENT PROGRAM ID | EXTERNAL IP ADDRESS | INTERNAL IP ADDRESS |
|---|---|---|
| STGMGMT1 | 172.16.50.1 | 192.168.60.1 |

ACCESS POINT TABLE OF STORAGE MANAGEMENT SERVER 2 — 321B

| STORAGE MANAGEMENT PROGRAM ID | EXTERNAL IP ADDRESS | INTERNAL IP ADDRESS |
|---|---|---|
| STGMGMT2 | 172.16.50.2 | 192.168.60.2 |
| 3211 | 3212 | 3213 |

FIG. 6C

STORAGE TABLE OF STORAGE MANAGEMENT SERVER 1 — 322A

| STORAGE ID | IP ADDRESS |
|---|---|
| STG1 | 192.168.60.11 |
| 3221 | 3222 |

FIG. 6D

STORAGE TABLE OF STORAGE MANAGEMENT SERVER 2 — 322B

| STORAGE ID | IP ADDRESS |
|---|---|
| STG2 | 192.168.60.12 |
| 3221 | 3222 |

FIG. 6E

GROUP MAPPING TABLE OF STORAGE MANAGEMENT SERVER 1 — 323A

| HYPERVISOR ID | VM GROUP ID | STORAGE ID | CTG ID |
|---|---|---|---|
| HV1 | VMGRP1 | STG1 | CTG1 |
| HV1 | VMGRP2 | STG1 | CTG2 |
| 3231 | 3232 | 3233 | 3234 |

FIG. 6F

GROUP MAPPING TABLE OF STORAGE MANAGEMENT SERVER 2 — 323B

| HYPERVISOR ID | VM GROUP ID | STORAGE ID | CTG ID |
|---|---|---|---|
| HV2 | VMGRP3 | STG2 | CTG1 |
| HV2 | VMGRP4 | STG2 | CTG2 |
| 3231 | 3232 | 3233 | 3234 |

| ACCESS POINT TABLE OF VM MANAGEMENT SERVER 1 | | |
|---|---|---|
| VM MANAGEMENT PROGRAM ID | EXTERNAL IP ADDRESS | INTERNAL IP ADDRESS |
| VMMGMT1 | 10.20.40.1 | 172.16.50.1 |

| ACCESS POINT TABLE OF VM MANAGEMENT SERVER 2 | | |
|---|---|---|
| VM MANAGEMENT PROGRAM ID | EXTERNAL IP ADDRESS | INTERNAL IP ADDRESS |
| VMMGMT2 | 10.20.40.2 | 172.16.50.2 |

| HYPERVISOR TABLE OF VM MANAGEMENT SERVER 1 | | |
|---|---|---|
| HOST ID | HYPERVISOR ID | IP ADDRESS |
| HOST1 | HV1 | 172.16.50.21 |

| HYPERVISOR TABLE OF VM MANAGEMENT SERVER 2 | | |
|---|---|---|
| HOST ID | HYPERVISOR ID | IP ADDRESS |
| HOST2 | HV2 | 172.16.50.22 |

| VM TABLE OF VM MANAGEMENT SERVER 1 | | | | |
|---|---|---|---|---|
| HYPERVISOR ID | VMID | STATUS | VM GROUP ID | 423A |
| HV1 | VM1 | POWER-ON | VMGRP1 | |
| HV1 | VM2 | POWER-ON | VMGRP1 | |
| HV1 | VM3 | POWER-ON | VMGRP2 | |
| 4231 | 4232 | 4233 | 4234 | |

FIG. 7F

| VM TABLE OF VM MANAGEMENT SERVER 2 | | | | |
|---|---|---|---|---|
| HYPERVISOR ID | VMID | STATUS | VM GROUP ID | 423B |
| HV2 | VM4 | POWER-OFF | VMGRP3 | |
| HV2 | VM5 | POWER-OFF | VMGRP3 | |
| HV2 | VM6 | POWER-OFF | VMGRP4 | |
| 4231 | 4232 | 4233 | 4234 | |

| HYPERVISOR PAIR TABLE OF VM MANAGEMENT SERVER 1 | |
|---|---|
| HYPERVISOR ID | REMOTE HYPERVISOR ID |
| HV1 | HV2 |
| 4241 | 4242 |

| HYPERVISOR PAIR TABLE OF VM MANAGEMENT SERVER 2 | |
|---|---|
| HYPERVISOR ID | REMOTE HYPERVISOR ID |
| HV2 | HV1 |
| 4241 | 4242 |

| VM GROUP PAIR TABLE OF VM MANAGEMENT SERVER 1 | | | |
|---|---|---|---|
| VM GROUP ID | Source/Target | REMOTE HYPERVISOR ID | REMOTE VM GROUP ID |
| VMGRP1 | SOURCE | HV2 | VMGRP3 |
| VMGRP2 | SOURCE | HV2 | VMGRP4 |

| VM GROUP PAIR TABLE OF VM MANAGEMENT SERVER 2 | | | |
|---|---|---|---|
| VM GROUP ID | Source/Target | REMOTE HYPERVISOR ID | REMOTE VM GROUP ID |
| VMGRP3 | TARGET | HV1 | VMGRP1 |
| VMGRP4 | TARGET | HV1 | VMGRP2 |

| STORAGE MANAGEMENT SERVER TABLE OF VM MANAGEMENT SERVER 1 | |
|---|---|
| STORAGE MANAGEMENT PROGRAM ID | IP ADDRESS |
| STGMGMT1 | 172.16.50.11 |

| STORAGE MANAGEMENT SERVER TABLE OF VM MANAGEMENT SERVER 2 | |
|---|---|
| STORAGE MANAGEMENT PROGRAM ID | IP ADDRESS |
| STGMGMT2 | 172.16.50.12 |

| VM-VOLUME MAPPING TABLE OF VM MANAGEMENT SERVER 1 | | |
|---|---|---|
| HYPERVISOR ID | VMID | VOLUME ID |
| HV1 | VM1 | STG1.1 |
| HV1 | VM2 | STG1.2 |
| HV1 | VM3 | STG1.3 |

| VM-VOLUME MAPPING TABLE OF VM MANAGEMENT SERVER 2 | | |
|---|---|---|
| HYPERVISOR ID | VMID | VOLUME ID |
| HV2 | VM4 | STG2.1 |
| HV2 | VM5 | STG2.2 |
| HV2 | VM6 | STG2.3 |

| ACCESS POINT TABLE OF VM DR CONTROL SERVER 1 ||
|---|---|
| EXTERNAL IP ADDRESS | INTERNAL IP ADDRESS |
| 10.20.30.1 | 10.20.40.1 |

| VM MANAGEMENT SERVER TABLE OF VM DR CONTROL SERVER 1 ||
|---|---|
| VM MANAGEMENT PROGRAM ID | IP ADDRESS |
| VMMGMT1 | 10.20.40.11 |
| VMMGMT2 | 10.20.40.12 |

| VM GROUP PAIR TABLE OF VM DR CONTROL SERVER ||||
|---|---|---|---|
| Source VM GOUP ID | Source VM MANAGEMENT PROGRAM ID | Target VM GROUP ID | Target VM MANAGEMENT PROGRAM ID |
| VMGRP1 | VMMGMT1 | VMGRP3 | VMMGMT2 |
| VMGRP2 | VMMGMT1 | VMGRP4 | VMMGMT2 |

5231     5232     5233     5234

STORAGE MANAGEMENT SERVER, METHOD OF CONTROLLING STORAGE MANAGEMENT SERVER, AND COMPUTER SYSTEM

TECHNICAL FIELD

The present invention relates to a computer system using a server and a storage.

BACKGROUND ART

In server virtualization environments in which servers and storages are connected, disaster recovery (DR) technologies using volume replication functions of storages are known (for example, see PTL 1).

Technologies using virtual volumes (VVOL) generated from logical storage containers as storages used by virtual machines (VMs) are known (for example, PTL 2).

CITATION LIST

Patent Literature

PTL 1: US Unexamined Patent Application Publication No. 2016/0098324
PTL 2: U.S. Pat. No. 8,775,774

SUMMARY OF INVENTION

Technical Problem

In systems capable of executing DR of virtual machines, a plurality of virtual machines are known to be managed in a group such as a cluster.

On the other hand, in the DR of the devices, there is a technology for grouping a plurality of volumes, maintaining data consistency between the volumes in the group in a unit of the group, and realizing a replication operation.

In a VM system in which a disk (for example, a virtual volume) allocated to a virtual machine and a volume of a storage are mapped in a one-to-one manner, it is necessary to associate the group of virtual machines and the volume of the storage in order to realize the DR in which the consistency of data is maintained in the unit of the group of the virtual machines.

In the foregoing technology of the related art, however, operation orders or parameters in the DR of the virtual machines and the DR operation of the storage are different depending on each specification. Therefore, there is the problem that it is difficult to maintain consistency only by simple mapping of virtual machines and volumes of storages and realize the DR management.

Solution to Problem

According to an aspect of the invention, a storage management server includes a memory storing management information and a management program and a processor executing the management program with reference to the management information, and manages a storage resource allocated to a server resource. The management information includes group mapping information for converting a first parameter of the server resource into a second parameter of the storage resource in association with the first parameter for specifying the server resource and the second parameter for specifying the storage resource. The processor receives an operation on the server resource and the first parameter, and converts the operation on the server resource into an operation on the storage resource based on preset information. The processor converts the first parameter of the server resource into the second parameter of the storage resource with reference to the group mapping information, specifies the storage resource included in the second parameter, and gives an instruction to operate the storage resource.

Advantageous Effects of Invention

According to the invention, changes in the configurations of the DR of the virtual machines and the DR of the storages can be interlocked. Therefore, in a computer system in which the disks of the virtual machines and the volumes of the storage are one-to-one, it is possible to realize a DR operation of maintaining consistency of data in the unit of the group of the virtual machines.

BRIEF DESCRIPTION OF DRAWINGS

FIG. 5A is a diagram illustrating an example of an access point table of a storage 1 according to the embodiment of the invention.

FIG. 5B is a diagram illustrating an example of an access point table of a storage 2 according to the embodiment of the invention.

FIG. 5C is a diagram illustrating an example of a remote storage table of the storage 1 according to the embodiment of the invention.

FIG. 5D is a diagram illustrating an example of a remote storage table of the storage 2 according to the embodiment of the invention.

FIG. 5E is a diagram illustrating an example of a volume table of the storage 1 according to the embodiment of the invention.

FIG. 5F is a diagram illustrating an example of a volume table of the storage 2 according to the embodiment of the invention.

FIG. 5G is a diagram illustrating an example of a consistency group pair table of the storage 1 according to the embodiment of the invention.

FIG. 5H is a diagram illustrating an example of a consistency group pair table of the storage 2 according to the embodiment of the invention.

FIG. 5I is a diagram illustrating an example of a volume pair table of the storage 1 according to the embodiment of the invention.

FIG. 5J is a diagram illustrating an example of a volume pair table of the storage 2 according to the embodiment of the invention.

FIG. 6A is a diagram illustrating an example of an access point table of a storage management server 1 according to the embodiment of the invention.

FIG. 6B is a diagram illustrating an example of an access point table of a storage management server 2 according to the embodiment of the invention.

FIG. 6C is a diagram illustrating an example of a storage table of the storage management server 1 according to the embodiment of the invention.

FIG. 6D is a diagram illustrating an example of a storage table of the storage management server 2 according to the embodiment of the invention.

FIG. 6E is a diagram illustrating an example of a group mapping table of the storage management server 1 according to the embodiment of the invention.

FIG. 6F is a diagram illustrating an example of a group mapping table of the storage management server 2 according to the embodiment of the invention.

FIG. 7A is a diagram illustrating an example of an access point table of a VM management server 1 according to the embodiment of the invention.

FIG. 7B is a diagram illustrating an example of an access point table of a VM management server 2 according to the embodiment of the invention.

FIG. 7C is a diagram illustrating an example of a hypervisor table of the VM management server 1 according to the embodiment of the invention.

FIG. 7D is a diagram illustrating an example of a hypervisor table of the VM management server 2 according to the embodiment of the invention.

FIG. 7E is a diagram illustrating an example of a VM table of the VM management server 1 according to the embodiment of the invention.

FIG. 7F is a diagram illustrating an example of a VM table of the VM management server 2 according to the embodiment of the invention.

FIG. 7G is a diagram illustrating an example of a hypervisor pair table of the VM management server 1 according to the embodiment of the invention.

FIG. 7H is a diagram illustrating an example of a hypervisor pair table of the VM management server 2 according to the embodiment of the invention.

FIG. 8A is a diagram illustrating an example of a VM group pair table of the VM management server 1 according to the embodiment of the invention.

FIG. 8B is a diagram illustrating an example of a VM group pair table of the VM management server 2 according to the embodiment of the invention.

FIG. 8C is a diagram illustrating an example of a storage management server table of the VM management server 1 according to the embodiment of the invention.

FIG. 8D is a diagram illustrating an example of a storage management server table of the VM management server 2 according to the embodiment of the invention.

FIG. 8E is a diagram illustrating an example of a VM-volume mapping table of the VM management server 1 according to the embodiment of the invention.

FIG. 8F is a diagram illustrating an example of a VM-volume mapping table of the VM management server 2 according to the embodiment of the invention.

FIG. 9A is a diagram illustrating an example of an access point table of a VM DR control server 1 according to the embodiment of the invention.

FIG. 9B is a diagram illustrating an example of a VM management server table of the VM DR control server 1 according to the embodiment of the invention.

FIG. 9C is a diagram illustrating an example of a VM group pair table of a VM DR control server according to the embodiment of the invention.

DESCRIPTION OF EMBODIMENTS

Hereinafter, an embodiment of the invention will be described with reference to the appended drawings.

Figure 1:
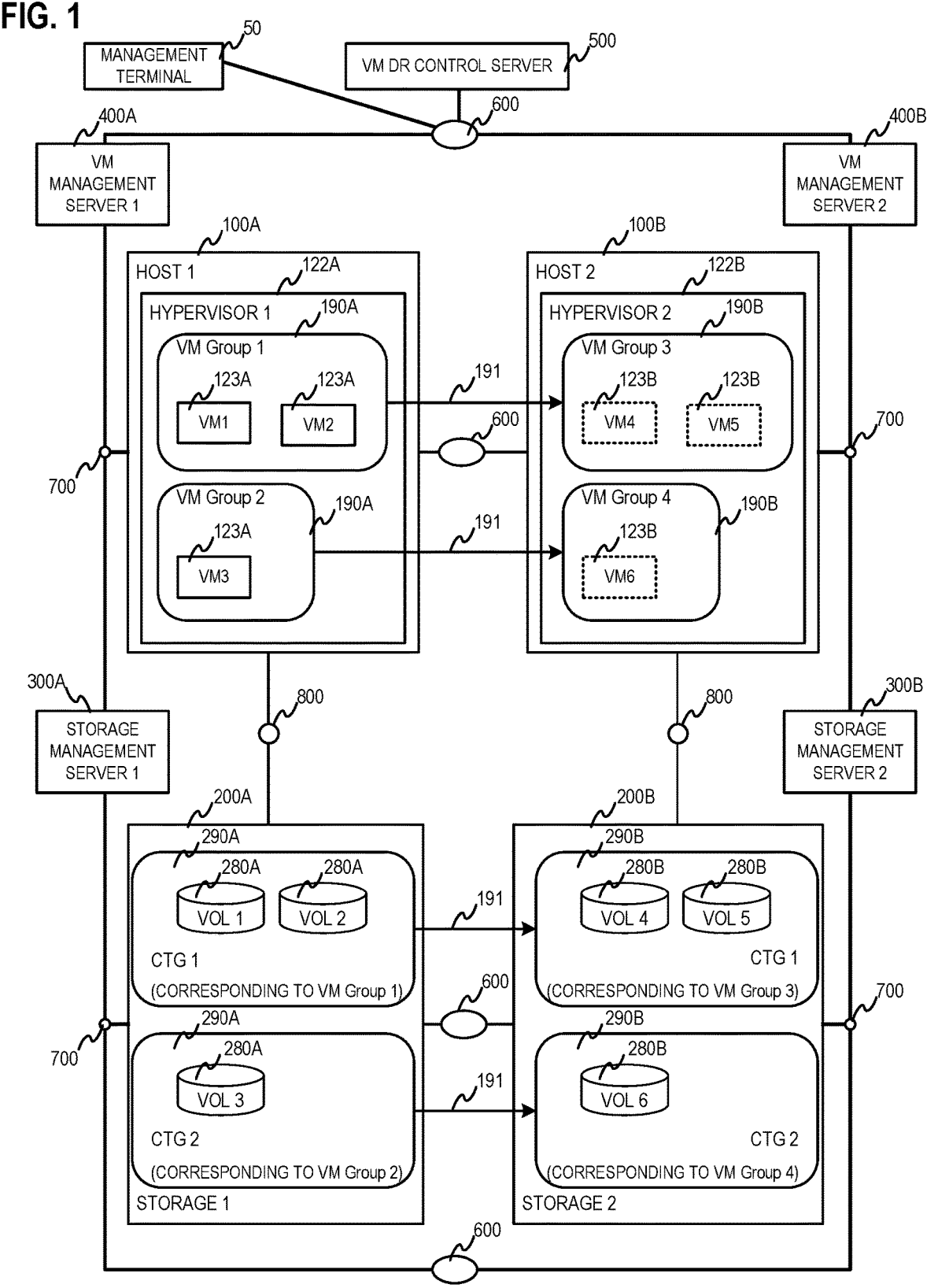
FIG. 1 is a block diagram illustrating an example of a computer system according to an embodiment of the invention.

FIG. 1 is a block diagram illustrating a configuration of a computer system according to an embodiment of the invention. The computer system in FIG. 1 includes a VM DR control server 500 that controls disaster recovery (hereinafter referred to as DR) of virtual machines (hereinafter referred to as VMs), hosts 100A and 100B that operate the the virtual machines, VM management servers 400A and 400B that control the virtual machines, storages 200A and 200B that supply volumes to the virtual machines, storage management servers 300 that control the volumes of the storages 200A and 200B, and a management terminal 50.

In the embodiment, "A" is given to a reference numeral of a device of a current use system (or a primary site) and "B" is given to a reference numeral of a device of a standby system (or a secondary site). Reference numerals with no "A" and "B" are used for factors common to devices of the current use system and the standby system in the description.

In the host 100, the VMs 123 and a hypervisor 122 executing the plurality of VMs 123 are activated. The VM 123 functions as a server.

The VM management server 400 is a computer that manages the hypervisor 122 and the VMs 123 activated in the host 100. The VM management server 400A of the current use system and the VM management server 400B of the standby system communicate with each other so that a VM DR process can be executed in a unit of the VM or a unit of a VM group 190 bundling the plurality of VMs 123. The VM management server 400 can instruct the storage management server 300 to manage the storage.

The storage 200 supplies a volume 280 to be used as a storage area to the VM 122 of the host 100. A data copy pair configuration can be constructed between the volumes of the plurality of storages 200 to control data copy in a unit of a volume or a group of a plurality of volumes.

According to the storage 200, a replication operation in the unit of the group of the volumes can be executed while maintaining data consistency between the volumes in the group. The group of the volumes is referred to as a Consistency Group (hereinafter referred to as a CTG).

The storage management server 300 executes resource management of the storage 200, a management operation for the storage resource on the other storage management server 300, and a process in response to an instruction of the storage management from the VM management server 400.

The VM DR control server 500 executes a process of a VM DR operation such as failover in a unit of a group of the VMs 123 in response to an instruction of the management terminal 50 used by a VM manager who has a management authority of the VMs 123. The VM DR control server 500 can instruct the VM management server 400 to execute the VM DR process.

The host 100 and the storage 200 are connected to each other via a network 800 such as a storage area network (SAN). The host 100 and the VM management server 400, the storage 200 and the storage management server 300, the VM management server 400 and the storage management server 300 can communicate with each other via a network 700 such as local area network (LAN).

The VM DR control server 500, the management terminal 50, and the VM management servers 400, the VM management servers 400A and 400B, the hosts 100A and 100B, the storages 200A and 200B, and the storage management servers 300A and 300B communicate with each other via a network 600 such as a wide area network (WAN).

The host 100 includes the hypervisor 122 and virtual machines (VMs) 123. The VMs 123 belong to a VM group (in the drawing, a VM Group) 190 which serves as a failover unit of the VMs.

The VM group 190A has a pair relation 191 for the DR with the VM group 190B of the host 100B of the other system. The VM 123A of the VM group 190A constructs a pair configuration of the DR with the VM 123B of the paired VM group 190B of the other system.

For example, the VM group 1 (in the drawing, VM Group 1) of the host 100A of the current use system in FIG. 1 has the pair relation 191 with the VM group 3 (in the drawing, VM Group 3) of the host 100B of the standby system.

A VM 1 and a VM 2 in the VM group 1 (190A) of the host 100A construct a pair configuration with a VM 4 and a VM 5 in the VM group 3 (190B) of the host 100B, respectively. At the time of failover from the VM group 1 to the VM group 3, the VM 1 and the VM 2 of the host 100A fail over to the VM 4 and the VM 5 of the host 100B, respectively.

The storage 200 includes a volume 280 connected to each VM 123 of the host 100. The volume 280 belongs to a CTG 290 which serves as a failover unit of the volume. The CTG 290 has a pair relation 291 with the CTG 290 of the other storage 200.

The volumes 280 of the CTG 290 construct a pair configuration of a volume copy with the volumes 280 of the paired CTG 290 of the other system. For example, the volumes VOL 1 and VOL 2 in the CTG 1 (290A) of the storage 1 (200A) of the current use system in FIG. 1 construct a pair configuration with VOL 4 and VOL 5 in the CTG 1 (290B) of the storage 2 (200B) of the standby system, respectively.

At the time of failover from the CTG 1 (290A) of the storage 1 (200A) to the CTG 1 (290B) of the storage 2 (200B), VOL 1 and VOL 2 fail over to VOL 4 and VOL 5, respectively.

In the computer system in FIG. 1, the VM group 190 corresponds to the CTG 290 of the storage 200. The VMs 123 in the VM group 190 are connected to the volumes 280 in the CTG 290 corresponding to the VM group 190. For example, in FIG. 1, the VM group 1 (190A) of the current use system is connected to the volumes 280A (VOL 1 and VOL 2) in the CTG 1 (290A).

When the failover of the VM group 190A is instructed, failover for the pair of CTGs 280 corresponding to the VM group 190A in the storage management server 300 is generated and executed. For example, when failover for a pair of the VM group 1 of the host 100A of the current use system and the VM group 3 of the host 100B of the standby system in FIG. 1 is instructed, the VM management server 400B of the standby system generates volume failover for the storage management server 300B. The storage management server 300B converts the VM group ID of a failover destination into a CTG ID with reference to the group mapping table 323B. Then, the storage management server 300B executes failover of the volumes by acquiring a remote CTG ID paired with the CTG ID converted from a consistency group pair table 224B of the storage 2 (200B) and transmitting an instruction to divide the pair of remote CTG IDs to the storage management server 300A of the current use system.

In the embodiment, by setting a correspondent relation between the ID of the VM group 190 and the volume group (CTG) ID in the group mapping table 323, it is possible to easily convert the VM group ID into the volume group (CTG) ID. Information regarding a replication pair of storage 1 (200A) and storage 2 (200B) can be set in the consistency group pair table 224, and the CTG IDs can be converted bidirectionally between the replication pair.

Since the VM group ID and the CTG (volume group) ID can be converted bidirectionally in the group mapping table 323, consistency of data is maintained between the VMs in the unit of the VM group 190 and a DR operation such as failover can be executed.

Figure 2:
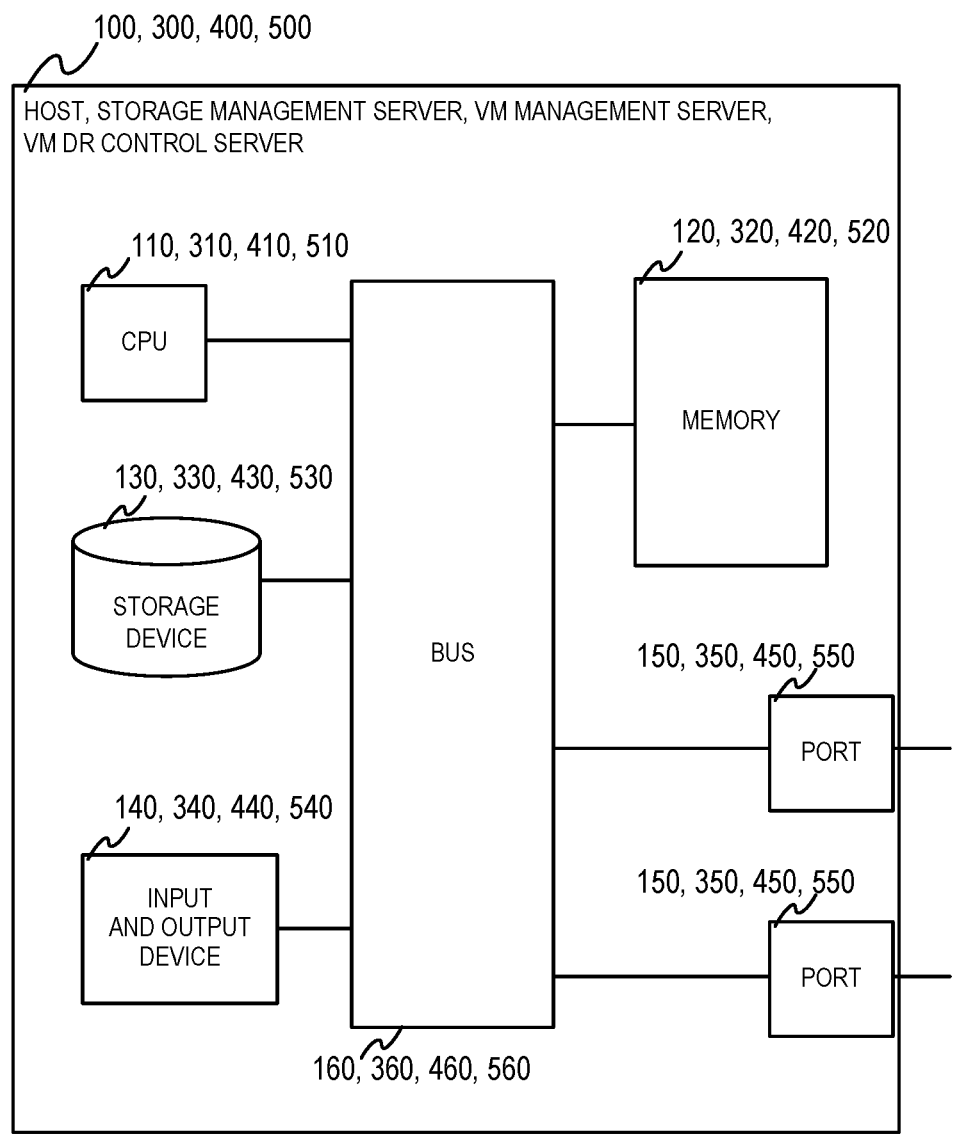
FIG. 2 is a block diagram illustrating an example of a host, a storage management server, a VM management server, and a VM DR control server according to the embodiment of the invention.

FIG. 2 is a block diagram illustrating an example of each configuration of the host 100, the storage management server 300, the VM management server 400, and the VM DR control server 500. These computers include central processing units (CPUs) 110, 310, 410, and 510 which are processors, memories 120, 320, 420, and 520 which are main storage devices, nonvolatile secondary storage devices 130, 330, 430, and 530, input and output devices 140, 340, 440, and 540, and ports 150, 350, 450, and 550. These constituent elements are connected to each other by buses 160, 360, 460, and 560.

The CPUs 110, 310, 410, and 510 execute programs stored in the memories 120, 320, 420, and 520 to realize a predetermined function of each computer. The memories 120, 320, 420, and 520 store programs to be executed by the CPUs 110, 310, 410, and 510 and data necessary to execute the programs. The programs are loaded from the secondary storage devices 130, 330, 430, and 530 to the memories 120, 320, 420, and 520.

The input and output devices 140, 340, 440, and 540 include one device or a plurality of devices such as a display, a pointer, and a keyboard. A user can operate each computer using the input and output devices 140, 340, 440, and 540.

The ports 150, 350, 450, and 550 are connected to the networks 600, 700, and 800 in FIG. 1. Each computer can communicate with another computer or the storage 200 via the ports 150, 350, 450, and 550.

The management terminal 50 can have the same configuration as the computer of FIG. 2.

Figure 3:
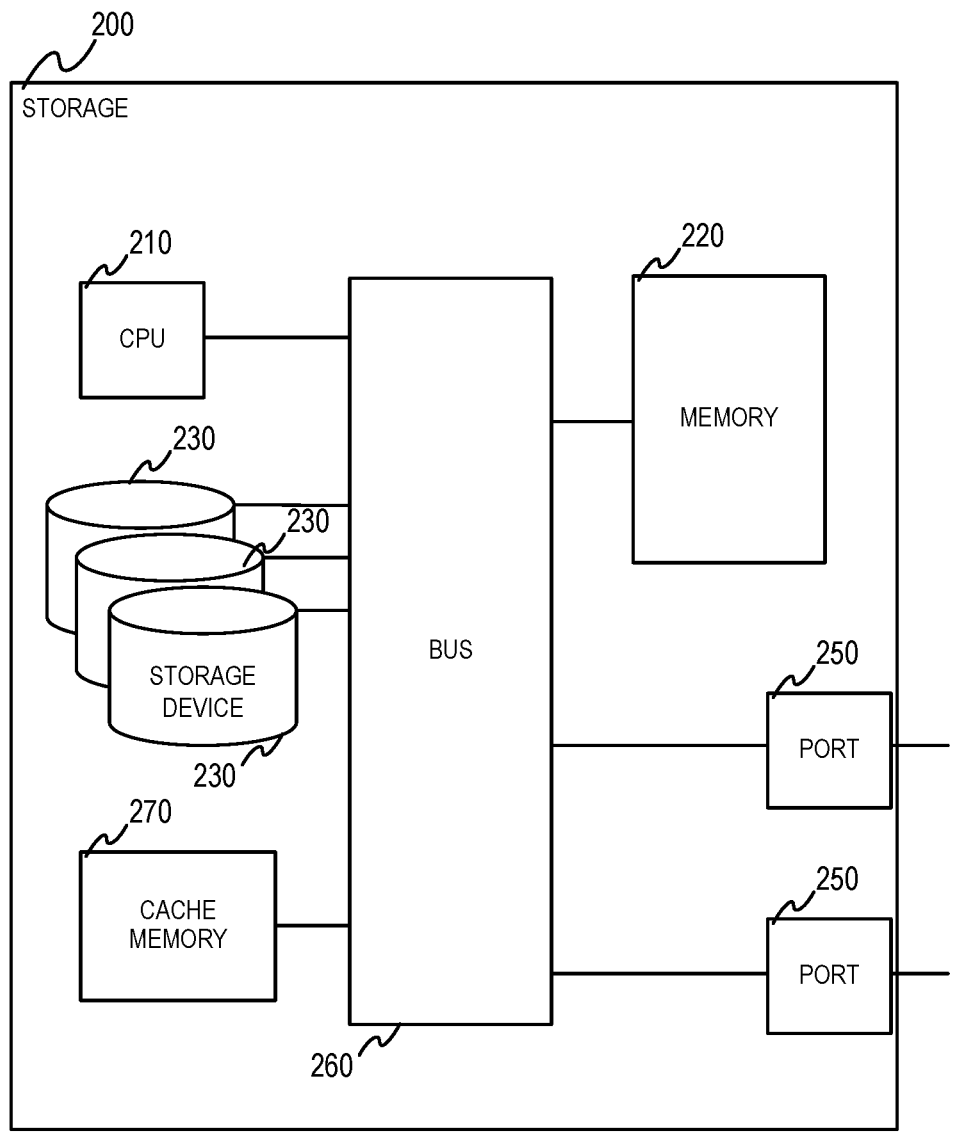
FIG. 3 is a block diagram illustrating an example of a configuration of a storage according to the embodiment of the invention.

FIG. 3 is a block diagram illustrating an example of a configuration of the storage 200. The storage 200 includes a CPU 210, a memory 220, a storage device 230, a port 250, and a cache memory 270. These constituent elements are connected to each other via a bus 260.

The CPU 210 executes a program for storage control to realize a predetermined function including I/O control from the host 100 and management and control of the volumes 280 of the storage 200.

The port 250 is connected to the network 800 in FIG. 1. The host 100 in FIG. 1 can communicate with the storage 200 via the port 250. The storage 200 receives an I/O request and write data from the host 100 via the port 250 and transmits read data to the host 100.

Figure 4A:
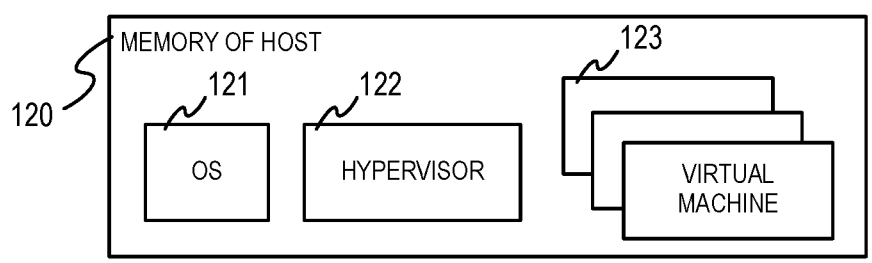
FIG. 4A is a block diagram illustrating examples of data and a program stored in a memory of the host according to the embodiment of the invention.

FIG. 4A is a block diagram illustrating examples of data and programs stored in a memory 120 of the host 100. The memory 120 of the host 100 retains an operating system (OS) 121, a hypervisor 122, and a program of the plurality of virtual machines 123. The OS 121 is loaded to each virtual machine 123.

Figure 4B:
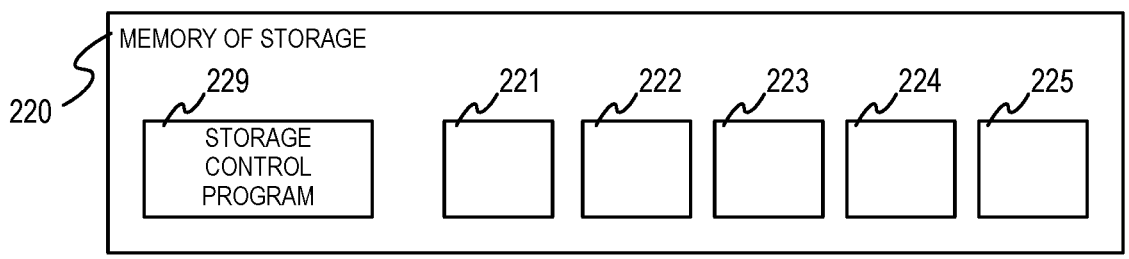
FIG. 4B is a block diagram illustrating examples of data and a program stored in a memory of the storage according to the embodiment of the invention.

FIG. 4B is a block diagram illustrating examples of data and the programs stored in the memory 220 of the storage 200. The memory 220 of the storage 200 retains a storage control program 229, an access point table 221, a remote storage table 222, a volume table 223, a consistency group pair table (replication pair information) 224, and a volume pair table 225.

The storage control program 229 executes I/O control between the host 100 and the volumes 280 and storage resource management such as the volumes 280 and a pool (not illustrated) supplying storage areas to the volumes 280. Each table retained by the memory 320 will be described below.

Figure 4C:
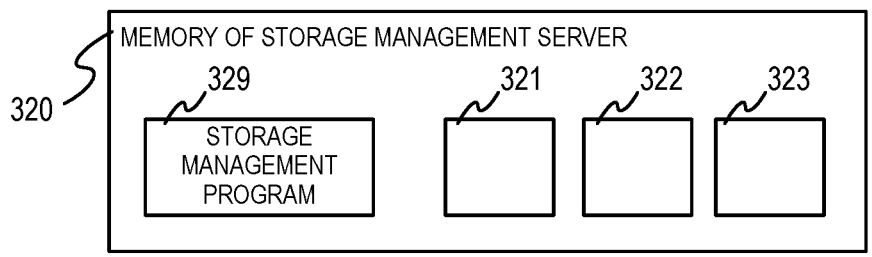
FIG. 4C is a block diagram illustrating examples of data and a program stored in a memory of the storage management server according to the embodiment of the invention.

FIG. 4C is a block diagram illustrating examples of data and a program stored in the memory 320 of the storage management server 300.

The memory 320 of the storage management server 300 retains a storage management program 329, an access point table 321, a storage table 322, and a group mapping table 323.

The storage management program 329 executes resource management of the plurality of storages 200 and a process corresponding to a storage operation instruction from the VM management program 429. Specifically, a process of converting a VM DR operation parameter into a volume copy operation parameter of the storage 200 or converting a VM DR operation order into an order in which a volume copy operation to the storage 200 is possible for execution is performed. Each table retained by the memory 320 will be described below.

Figure 4D:
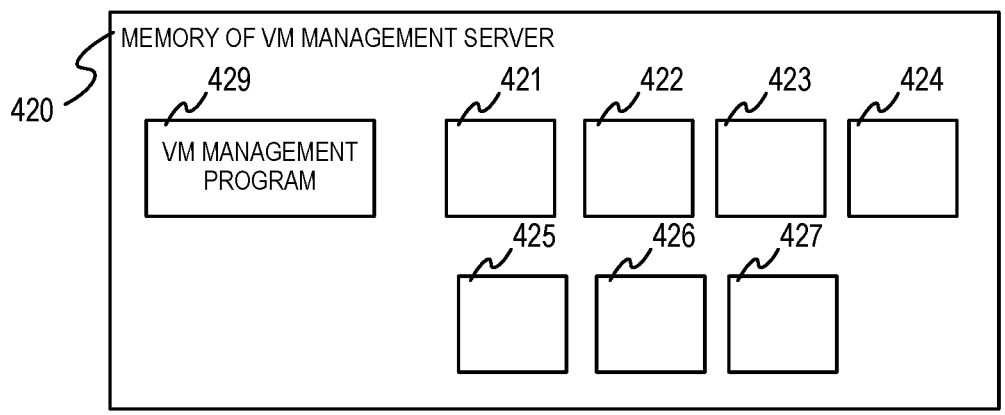
FIG. 4D is a block diagram illustrating examples of data and a program stored in a memory of the VM management server according to the embodiment of the invention.

FIG. 4D is a block diagram illustrating examples of data and a program stored in the memory 420 of the VM management server 400.

The memory 420 of the VM management server 400 retains a VM management program 429, an access point table 421, a hypervisor table 422, a VM table 423, a hypervisor pair table 424, a VM group pair table 425, a storage management server table 426, and a VM volume mapping table 427.

The VM management program 429 executes a VM management operation and a process of a storage operation instruction to the storage management program 329. Each table retained by the memory 420 will be described below.

Figure 4E:
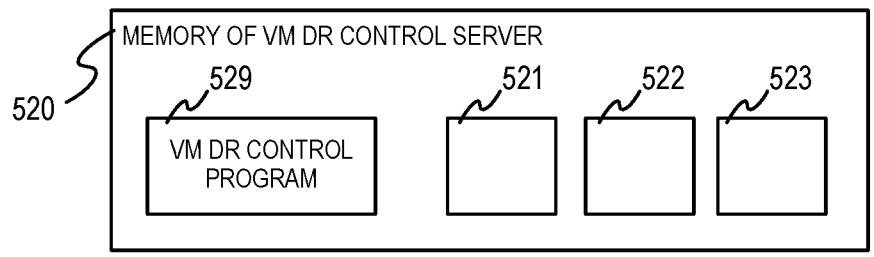
FIG. 4E is a block diagram illustrating examples of data and a program stored in a memory of the VM DR control server according to the embodiment of the invention.

FIG. 4E is a block diagram illustrating examples of data and a program stored in the memory 520 of the VM DR control server 500.

The memory 520 of the VM DR control server 500 retains a VM DR control program 529, an access point table 521, a VM management server table 522, and a VM group pair table 523.

The VM DR control program 529 receives a request for operating the VM DR from the management terminal 50 used by the VM manager and executes a process of transmitting the request for operating the VM DR to the VM management program 429. Each table retained by the memory 520 will be described below.

FIGS. 5A to 5J are diagrams illustrating examples of configurations of tables in which the memories 220 of the storages 200A and 200B are retained.

FIGS. 5A and 5B are diagrams illustrating examples of access point tables 221. The access point tables 221A and 221B each have a storage ID field 2211 in which a storage ID of the storage 200 is retained and an IP address field 2212 in which an IP address serving as an access point to the storage 200 is retained.

The access point table 221 is information set in advance in the management terminal 50 or the like used by the manager or the like.

FIGS. 5C and 5D are diagrams illustrating examples of remote storage tables 222. The remote storage tables 222A and 222B each have a remote storage ID field 2221 in which a storage ID of the storage capable of constructing a copy pair configuration of the volumes is retained and a remote path ID 2222 in which an ID of a data path of the volume copy is retained.

FIGS. 5E and 5F are diagrams illustrating examples of volume tables 223. The volume tables 223A and 223B each have a volume ID 2231 in which IDs of the volumes of the storage 200 are retained, a capacity field 2232 in which values of the capacities of the volumes 280 are retained, and a CTG ID field 2233 in which an ID of the CTG 290 in which the volumes 280 are registered is retained. In the embodiment, the ID of the volume has a format of <storage ID> and <unique ID in storage>.

The volume table 223 is information that is set in the management terminal 50 or the like used by the manager or the like and is updated by the storage management server 300. In the volume table 223, a correspondent relation between the volume 280 and the CTG 290 is defined.

FIGS. 5G and 5H are diagrams illustrating examples of consistency group pair tables 224. The consistency group pair tables 224A and 224B each have a CTG ID field 2241 in which the ID of the CTG 290 of the storage 200 is retained, a primary/secondary field 2242 in which information indicating that the CTG of the CTG ID field 2241 is primary (data copy source) or secondary (data copy destination) is retained, a remote storage ID field 2243 in which the ID of the storage in which there is the CTG paired with the CTG of the CTG ID field 2241 is retained, and a remote CTG ID field 2244 in which the ID of the CTG paired with the CTG of the CTG ID field 2241 is retained.

In the primary/secondary field 2242, a text string of "Primary" is registered when the CTG is primary and a text string of "Secondary" is registered when the CTG is secondary.

The consistency group pair table 224 is information that is set in the management terminal 50 or the like used by the manager or the like and is updated by the storage management server 300. In the consistency group pair table 224, a correspondent relation between the CTG 290 paired in the other system and the storage 200 is defined.

FIGS. 5I and 5J are diagrams illustrating examples of volume pair tables 225. The volume pair tables 225A and 225B each have a volume ID field 2251 in which the ID of the volume of the storage 200 is retained, a PVOL/SVOL field 2252 in which information indicating whether the volume of the volume ID field 2251 is a primary volume (a copy source volume) or a secondary volume (a copy destination volume) is retained, a remote volume ID field 2253 in which the ID of the volume paired with the volume of the volume ID field 2251 is retained, and a pair status field 2254 in which information indicating a data copy status between the paired volumes is retained.

In the PVOL/SVOL field 2252, a text string of "PVOL" is registered when the volume is a primary volume, and a text string of "SVOL" is registered when the volume is a secondary volume. In the pair status field 2254, a text string of "COPY" is registered during data copy between the paired volumes, a text string of "SYNC" is registered in a copy completion status, and a text string of "SUSPEND" is registered in a copy stop status.

The volume pair table 225 is information that is set in the management terminal 50 or the like used by the manager or the like and is updated by the storage management server 300. In the volume pair table 225, a correspondent relation between the CTG 290 paired in the other system and the storage 200 is defined.

FIGS. 6A to 6F are diagrams illustrating examples of configurations of tables in which the memories 320 of the storage management servers 300A and 300B are retained.

FIGS. 6A and 6B are diagrams illustrating examples of the access point tables 321. The access point tables 321A and 321B each have a storage management program ID field 3211 in which the ID of the storage management program 329 of the storage management server 300 is retained, an external IP address field 3212 in which an IP address serving as an access point for mutual communication between the VM management server 400 and the storage management server 300 is retained, and an internal IP address field 3213 in which an IP address serving as an access point for mutual communication between the storage management server 300 and the storage 200 is retained.

The access point table 321 is information that is set in advance in the management terminal 50 or the like used by the manager or the like.

FIGS. 6C and 6D are diagrams illustrating examples of the storage tables 322. The storage tables 322A and 322B each have a storage ID field 3221 in which the ID of the storage managed by the storage management program 329 is retained and an IP address field 3222 in which an IP address of the storage 200 of the storage ID field 3221 is retained.

The storage table 322 is information that is set in advance in the management terminal 50 or the like used by the manager or the like.

FIGS. 6E and 6F are diagrams illustrating examples of the group mapping tables 323. The group mapping tables 323A and 323B each have a hypervisor ID field 3231 in which an ID of the hypervisor of the host 100 connected to the storage 200 managed by the storage management program 329 is retained, a VM group ID field 3232 indicating an ID of the group of the VMs activated on the hypervisor of the hypervisor ID field 3231, a storage ID field 3233 in which the ID of the storage 200 is retained, and a CTG ID field 3234 in which the ID of the CTG associated with the VM group 190 of the VM group ID field 3232 is retained.

The group mapping table 323 is information that is set in the management terminal 50 or the like used by the manager or the like and is updated by the storage management server 300. In the group mapping table 323, a correspondent relation between the VM group 190 on the hypervisor 122 and the CTG 290 of the storage 200 is defined.

FIGS. 7A to 7H and 8A to 8F are diagrams illustrating configuration examples of tables retained in the memories 420 of the VM management servers 400A and 400B.

FIGS. 7A and 7B are diagrams illustrating examples of the access point tables 421. The access point tables 421A and 421B each have a VM management program ID field 4211 in which an ID of the VM management program 429 of the VM management server 400 is retained, an external IP address field 4212 in which an IP address serving as an access point for mutual communication between the VM DR control server 500 and the VM management server 400 is retained, and an internal IP address field 4213 in which an IP address serving as an access point for mutual communication between the VM management server 400 and the storage management server 300 is retained.

The access point table 421 is information that is set in advance in the management terminal 50 or the like used by the manager or the like.

FIGS. 7C and 7D are diagrams illustrating examples of the hypervisor tables 422. The hypervisor tables 422A and 422B each have a host ID field 4221 in which the ID of the host managed by the VM management program 429 is retained, a hypervisor ID 4222 in which an ID of a hypervisor activated on the host of the host ID field 4221 is retained, and an IP address field 4223 in which an IP address of the host of the host ID field 4221 is retained.

The hypervisor table 422 is information that is set in advance in the management terminal 50 or the like used by the manager or the like.

FIGS. 7E and 7F are diagrams illustrating examples of the VM tables 423. The VM tables 423A and 423B each have a hypervisor ID field 4231 in which the ID of the hypervisor activated on the host managed by the VM management program 429 is retained, a VM ID field 4232 in which the ID of the VM activated on the hypervisor of the hypervisor ID field 4231 is retained, a status field 4233 in which information indicating a VM status of the VM ID field 4232 is retained, and a VM group ID field 4234 in which an ID of the VM group 190 in which the VMs of the VM ID field 4232 are registered is retained. In the status field 4233, a text string of "POWER-ON" is registered when the VM is activated, and a text string of "POWER-OFF" is registered when the VM is stopped.

The VM table 423 is information that is set in advance in the management terminal 50 or the like by the manager or the like and is updated by the VM management server 400. By referring to the VM table 423, it is possible to acquire statuses of the VM 123 and the VM group 190 to which the VM 123 belongs.

FIGS. 7G and 7H are diagrams illustrating examples of the hypervisor pair tables 424. The hypervisor pair tables 424A and 424B each have a hypervisor ID field 4241 in which the ID of the hypervisor activated on the host managed by the VM management program 429 is retained and a remote hypervisor ID field 4242 in which IDs of the hypervisor of the hypervisor ID field 4241 and the hypervisor in which the DR management is possible are retained.

The hypervisor pair table 424 is information that is set in advance in the management terminal 50 or the like used by the manager or the like. In the hypervisor pair table 424, the hypervisor 122 paired with the other system is defined.

FIGS. 8A and 8B are diagrams illustrating examples of the VM group pair tables 425 of the VM management server 400.

The VM group pair tables 425A and 425B each have a VM group ID field 4251 in which the ID of the group of the VMs 123 activated on the host 100 managed by the VM management program 429 is retained, a Source/Target field 4252 in which information indicating one of a source (a VM data copy source) or a target (a VM data copy destination or a failover destination) of the VM group 190 of the VM group ID field 4251 is retained, a remote hypervisor ID field 4253 in which the ID of the hypervisor activated by the VM of the VM group paired with the VM group of the VM group ID field 4251 is retained, and a remote VM group ID field 4254 in which the ID of the VM group paired with the VM group of the VM group ID field 4251 is retained.

In the Source/Target field 4252, a text string of "SOURCE" is registered when the VM group is a source, and a text string of "Target" is registered when the VM group is a target.

The VM group pair table 425 is information that is set in the management terminal 50 or the like used by the manager or the like and is updated by the VM management server 400. In the VM group pair table 425, a pair of the VM group 190A of a movement source and the VM group 190B of a movement destination is defined.

FIGS. 8C and 8D are diagrams illustrating examples of the storage management server tables 426. The storage management server tables 426A and 426B each have a storage management program ID field 4261 in which an ID of the storage management program of the storage management server 300 communicating with the VM management server 400 is retained and an IP address field 4262 in which an IP address of the storage management server 300 is retained.

The storage management server table 426 is information that is set in advance in the management terminal 50 or the like used by the manager or the like.

FIGS. 8E and 8F are diagrams illustrating examples of the VM-volume mapping tables 427. The VM-volume mapping tables 427A and 427B each have a hypervisor ID field 4271 in which the ID of the hypervisor activated on the host managed by the VM management program 429 is retained, a VM ID field 4272 in which the ID of the VM activated with the hypervisor of the hypervisor ID field 4271 is retained, and a volume ID field 4273 in which an ID of the volume of the storage management server 300 to which the VM of the VM ID field 4272 is connected is retained.

The VM-volume mapping table 427 is information that is set in advance in the management terminal 50 or the like used by the manager or the like. In the VM-volume mapping table 427, an ID of the volume 280 allocated to the VM 123 is defined.

FIGS. 9A to 9C are diagrams illustrating configuration examples of tables retained in the memory 520 of the VM DR control server 500.

FIG. 9A is a diagram illustrating an example of the access point table 521. The access point table 521 has an external IP address field 5211 in which an IP address for accessing the VM DR control server 500 from the management terminal 50 used by the VM manager is retained and an internal IP address field 5212 in which an IP address serving as an access point for mutual communication between the VM DR control server 500 and the VM management server 400 is retained.

The access point table 521 is information that is set in advance in the management terminal 50 or the like used by the manager or the like.

FIG. 9B is a diagram illustrating an example of the VM management server table 522. The VM management server table 522 has a VM management program ID field 5221 in which an ID of the VM management program 429 managed by the VM DR control program 529 is retained and an IP address field 5222 in which an IP address of the VM management server 400 activated by the VM management program 429 of the VM management program ID field 5221 is retained.

The VM management server table 522 is information that is set in advance in the management terminal 50 or the like used by the manager or the like.

FIG. 9C is a diagram illustrating an example of the VM group pair table 523. The VM group pair table 523 has a Source VM group ID field 5231 in which an ID of the VM group serving as a source is managed, a Source VM management program ID field 5232 in which an ID of the VM management program managing the VM group of the Source VM group ID field 5231 is retained, a Target VM group ID field 5233 in which an ID of the VM group serving as a target is managed, and a Target VM management program ID field 5234 in which an ID of the VM management program managing the VM group of the Target VM group ID field 5231 is retained.

The VM management server table 522 is information that is set in the management terminal 50 or the like used by the manager or the like and is updated by the VM DR control program 529. In the VM management server table 522, a relation between the VM group 190A of a movement source and the VM group 190B of a movement destination at the time of executing the DR is defined.

<Description of Process>

Examples of processes of VM management operations in the computer system according to the embodiment will be described with reference to FIGS. 10A to 13.

In FIGS. 10A to 13, the VM DR control program 529 is activated in the VM DR control server 500 illustrated in FIG. 1. The VM management program 429 is activated in the VM management server 1 (200A) in FIG. 1 and the VM management program 429 is activated in the VM management server 2 (200B) in FIG. 1. The storage management program 329 is activated in the storage management server 1 (300A) in FIG. 1 and the storage management program 329 is activated in the storage management server 2 (300B).

Figure 10A:
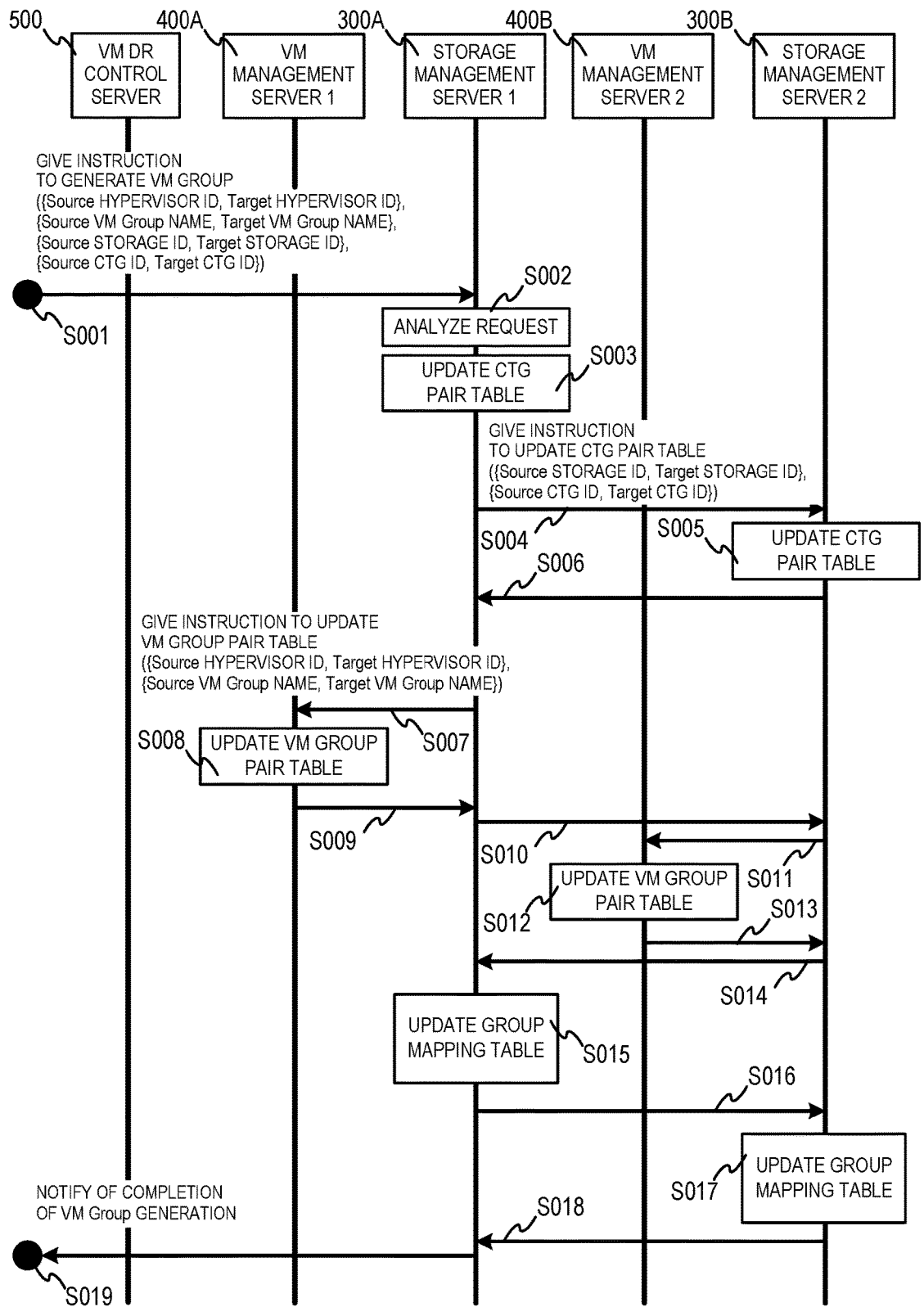
FIG. 10A is a sequence diagram illustrating an example of a process of generating a VM group according to the embodiment of the invention.

FIG. 10A is a sequence diagram illustrating an example of a process of generating the VM group 190. First, in step S001, the management terminal 50 used by a storage manager instructs the storage management program 329 of the storage management server 1 (300A) to generate the VM group 190. At this time, the management terminal 50 used by the storage manager designates a hypervisor ID, a VM group name, a storage ID, and a CTG ID of each Source/Target.

Subsequently, in step S002, the storage management program 329 of the storage management server 300A analyzes instruction content received from the management terminal 50 of the storage manager. Then, the storage management program 329 confirms that the hypervisor ID, the VM group name, the storage ID, and the CTG ID of each Source/Target are input.

Subsequently, in step S003, the storage management program 329 of the storage management server 300A updates the consistency group pair table 224A of the storage 1 (200A) based on the storage ID and the CTG ID input from the management terminal 50 of the storage manager in step S001.

Subsequently, in step S004, the storage management program 329 of the storage management server 300 of the current use system instructs the storage management program 329 of the storage management server 300B of the standby system to update the consistency group pair table 224B based on the storage ID and the CTG ID input from the management terminal 50 of the storage manager in step S001.

Subsequently, in step S005, the storage management program 329 of the storage management server 300B updates the consistency group pair table 224B based on the storage ID and the CTG ID designated from the storage management program 329 in step S004.

Subsequently, in step S006, the storage management program 329 of the storage management server 300B transmits a completion notification of the update process for the consistency group pair table to the storage management program 329 of the storage management server 300A of the current use system.

Subsequently, in step S007, the storage management program 329 of the storage management server 300A instructs the VM management program 429 of the VM management server 400A to update the VM group pair table 425A based on the VM group name and the hypervisor ID input from the management terminal 50 of the storage manager in step S001.

Subsequently, in step S008, the VM management program 429 of the VM management server 400A of the current use system updates the VM group pair table 425A based on the VM group name and the hypervisor ID designated from the storage management program 329 in step S007.

Subsequently, in step S009, the VM management program 429 of the VM management server 400A transmits a completion notification of the update process for the VM group pair table to the storage management program 329 of the storage management server 300A.

Subsequently, in step S010, the storage management program 329 of the storage management server 300A instructs the storage management program 329 of the storage management server 300B of the standby system to update the VM group pair table 425B based on the VM group name and the hypervisor ID input from the management terminal 50 of the storage manager in step S001.

Subsequently, in step S011, the storage management program 329 of the storage management server 300B instructs the VM management program 429 of the VM management server 400B to update the VM group pair table 425B based on the VM group name and the hypervisor ID designated from the storage management program 329 in step S010.

Subsequently, in step S012, the VM management program 429 of the VM management server 400B updates the VM group pair table 425B based on the VM group name and the hypervisor ID designated from the storage management program 329 in step S011.

Subsequently, in step S013, the VM management program 429 of the VM management server 400B transmits a completion notification of the update process for the VM group pair table to the storage management program 329.

Subsequently, in step S014, the storage management program 329 of the storage management server 300B transmits a completion notification of the update process for the VM group pair table to the storage management program 329 of the storage management server 300A.

Subsequently, in step S015, the storage management program 329 of the storage management server 300A updates the group mapping table 323A based on the hypervisor ID, the VM group name, the storage ID, and the CTG ID input from the management terminal of the storage manager in step S001.

Subsequently, in step S016, the storage management program 329 of the storage management server 300A instructs the storage management program 329 of the storage management server 300B to update the group mapping table 323B based on the hypervisor ID, the VM group name, the storage ID, and the CTG ID input from the management terminal 50 of the storage manager in step S001.

Subsequently, in step S017, the storage management program 329 of the storage management server 300B updates the group mapping table 323B based on the hypervisor ID, the VM group name, the storage ID, and the CTG ID designated from the storage management program 329 in step S016.

Subsequently, in step S018, the storage management program 329 of the storage management server 300B transmits a completion notification of the update of the group mapping table to the storage management program 329 of the storage management server 300A.

Subsequently, in step S019, the storage management program 329 of the storage management server 300A transmits a completion notification of the generation of the VM group to the management terminal 50 of the storage manager.

Through the foregoing process, the storage management server 300A of the current use system and the storage management server 300B of the standby system update the consistency group pair tables 224A and 224B, the VM management servers 400A and 400B update the VM group pair tables 425A and 425B, and the storage management servers 300A and 300B update the group mapping tables 323A and 323B. As a result of the update, the VM groups 190A and 190B are generated in the current use system and the standby system, respectively.

The VM group pair table 523 of the VM DR control server 500 is updated at a predetermined timing by the VM DR control program 529. The VM DR control program 529 may periodically communicate with each of the VM management programs 429 of the VM management servers 400A and 400B, acquire information of the VM group 190, and update the VM group pair table 523. The VM DR control program 529 may communicate with the VM management program 429 of each of the VM management servers 400A and 400B at a timing at which the VM group pair table 523 is referred to, acquire information of the VM group 190, and update the VM group pair table 523.

Figure 10B:
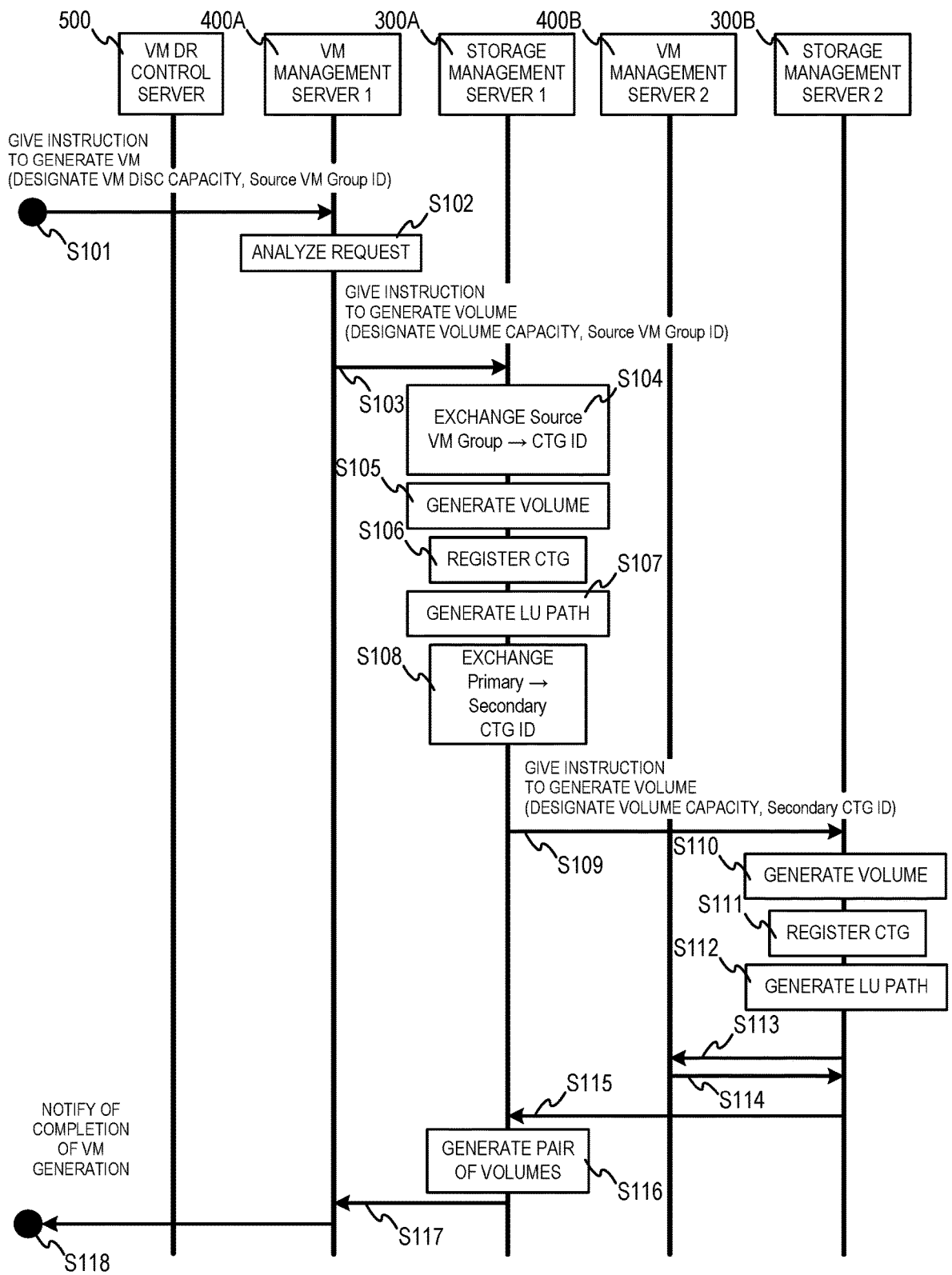
FIG. 10B is a sequence diagram illustrating an example of a process of generating a virtual machine with a replication configuration according to the embodiment of the invention.

FIG. 10B is a sequence diagram illustrating an example of a process of generating the VM 123 with a replication configuration.

First, in step S101, the VM manager instructs the VM management program 429 of the VM management server 400A of the current use system to generate the VM 123 with the replication configuration via the management terminal 50. At this time, the VM manager uses the management terminal 50 to designate a disk capacity of the VM 123 of a generation target and the VM group ID with which the VM 123 of the generation target is registered.

Subsequently, in step S102, the VM management program 429 of the VM management server 400A analyzes content of the instruction received from the management terminal 50 of the VM manager. The VM management program 429 of the VM management server 400A confirms that information designated in the VM group ID field 4251 of the VM group pair table 425A is included and the corresponding pair status field 4252 is "SOURCE," that is, the VM group 190 is a copy source.

Subsequently, in step S103, the VM management program 492A of the VM management server 400A instructs the storage management program 329 to generate a volume for a disk of a generation target VM. At this time, the VM management program 429 of the VM management server 400A designates a volume capacity and the VM group ID designated from the management terminal 50 of the VM manager.

In step S103 described above, the example in which the VM management server 400A converts the operation on the VM group 190 (generating the VM) into the operation on the volume group (generating the volume group) has been described, but the invention is not limited thereto. The storage management server 300 may receive the operation on the VM group 190 and convert the operation into failover of the volume group.

The conversion of the operation is executed in accordance with a preset table or rule. In the embodiment, in the conversion of the operation, an operation such as generation (addition), failover, or movement of the VM group 190 is converted into an operation such as generation (addition), failover, or movement of the volume group (the CTG 290).

Subsequently, in step S104, the storage management program 329 of the storage management server 300A converts the designated VM group ID into the corresponding CTG ID with reference to the VM group ID field 3232 and the CTG ID field 3234 of the group mapping table 323A.

Thus, the storage management server 300A can associate the ID of the CTG (volume group) 290A with the ID of the VM group 190A of the host 100A.

Subsequently, in step S105, the storage management program 329 of the storage management server 300A instructs the storage 1 (200A) to generate the volume 280A with the designated capacity. After the process is completed, the storage control program 229 of the storage 1 (200A) adds information of the volume to the volume ID field 2231 and the capacity (GB) field 2232 of the volume table 223A.

Subsequently, in step S106, the storage management program 329 of the storage management server 300A instructs the storage 1 (200A) to execute a process of registering the volume generated in step S105 in the CTG 290A which has the CTG ID converted from the VM group ID in step S104.

After the process is completed, the storage control program 229 of the storage 1 (200A) adds a CTG ID with which the volume is registered, to the CTG ID field 2233 in a row added to the volume table 223 in step S105.

Subsequently, in step S107, the storage management program 392A of the storage management server 300A instructs the storage 1 (200A) to generate an LU path of the generated volume 280A. At this time, the storage management program 329 of the storage management server 300A designates a volume ID of the volume 280A generated in step S105 and a port ID of the port 250 to which the host 100A is connected.

The LU path can be generated using, for example, an administrative logical unit (ALU) and a subsidiary logical unit (SLU) defined in a conglomerate LU structure. In this case, a preset representative volume can be set as an ALU and the volume 280 can be mapped as an SLU. The volume 280 may be a virtual volume.

Subsequently, in step S108, the storage management program 329 of the storage management server 300A converts the CTG ID of the CTG 290A in which the volume 280A is registered in step S106 into a CTG ID of the CTG 290B of the paired storage 2 (200B) of the standby system. In this process, the storage management server 300A acquires the remote storage ID field 2243 and the remote CTG ID 2244 from the consistency group pair table 224A of the storage 1 (200A) and sets the remote storage ID field 2243 and the remote CTG ID 2244 as a pair of CTG IDs.

Then, the storage management program 329 of the storage management server 300A transmits a request for acquiring the CTG ID of the paired CTG 290B to the storage 1 (200A) along with the CTG ID of the CTG 290A in which the volume 280A is registered in step S106. The storage 1 (200A) acquires the CTG ID of the CTG 290A paired with the CTG 290B with the CTG ID received from the storage management program 329 from the information of the CTG ID field 2241, the remote storage ID field 2243, and the remote CTG ID 2244 field of the consistency group pair table 224A and responds to the storage management program 329.

Subsequently, in step S109, the storage management program 329 of the storage management server 300A of the current use system instructs the storage management program 329 activated in the storage management server 300B of the standby system to execute a process of generating the volume 280B with the same capacity as the volume 280A generated in step S105. At this time, the storage management program 329 of the current use system designates a volume capacity and the CTG ID acquired from the storage 1 (200A) in step S108.

Subsequently, in step S110, the storage management program 329 of the storage management server 300B of the standby system instructs the storage 2 (200B) to execute a process of generating the volume 280B with the designated capacity.

After the process is completed, the storage management program 329 of the storage management server 300B adds information of the volume 280B to the volume ID field 2231 and the capacity (GB) field 2232 of the volume table 223B.

Subsequently, in step S111, the storage management program 329 of the storage management server 300B instructs the storage 2 (200B) to execute a process of registering the volume 280B generated in step S110 in the CTG 290B with the CTG ID designated in step S109.

After the process is completed, the storage management program 329 of the storage management server 300B adds the CTG ID with which the volume 280B is registered to the CTG ID field 2233 in the row to be added to the volume table 223B in step S112.

Subsequently, in step S112, the storage management program 392B of the storage management server 300B instructs the storage 2 (200B) to generate an LU path of the generated volume 280B. At this time, the storage management program 329 of the storage management server 300B designates a volume ID of the volume 280B generated in step S105 and a port ID of the port 250 to which the host 100B is connected. The LU path is generated similarly to the current use system, and the ALU and the SLU of the conglomerate LU structure can be used.

Subsequently, in step S113, the storage management program 329 of the storage management server 300B transmits the volume ID of the volume 280B generated in step S112 and a request for updating the volume mapping information to the VM management program 429 of the VM management server 400B.

The VM management program 429 of the VM management server 400B adds a hypervisor ID to the hypervisor ID field 4231 of the VM table 423B, adds a new VM ID to the VM ID field 4232, adds "POWER-OFF" to the status field 4233, and adds the VM group ID to the VM group ID field 4234. The VM management program 429 of the VM management server 400B adds a hypervisor ID to the hypervisor ID field 4271 of the volume mapping table 427B, adds a new VM ID to the VM ID field 4272, adds volume ID information received from the storage management program 329 to the volume ID 4273.

Subsequently, in step S114, the VM management program 429 of the VM management server 400B transmits a completion notification of the update of the volume mapping information to the storage management program 329 of the storage management server 300B.

Subsequently, in step S115, the storage management program 329 of the storage management server 300B transmits a completion notification of the volume generation process and the volume ID of the generated volume 280B to the storage management program 329 of the storage management server 300A.

Subsequently, in step S116, the storage management program 329 of the storage management server 300A of the current use system instructs the storage 1 (200A) to generate a pair of volumes. At this time, the storage management program 329 of the storage management server 300A designates a volume ID of the volume 280A generated in step S105 and a volume ID of the volume 280B generated in step S110.

The storage control program 229 of the storage 1 (200A) executes a pair generation process between the volumes with the volume ID designated by the storage management program 239A of the storage management server 300A in cooperation with the storage control program 299 of the storage 2 (200B).

After the pair generation process starts, the storage control program 299 of the storage 1 (200A) adds information to the volume ID field 2251, the PVOL/SVOL field 2252, the remote volume ID field 2253, and the pair status field 2254 of the volume pair table 255A. Immediately after the pair generation process starts, "COPY" is added to the pair status field 2254 of the volume pair table 255A.

When the pair generation process is completed and the data between the pair of volumes enters a synchronous status, the storage control program 229 of the storage 1 (200A) changes the pair status field of the volume pair table 225A to "SYNC."

Subsequently, in step S117, the storage management program 239A of the storage management server 300A transmits a completion notification of the volume generation process and the volume ID of the generated volume 280A to the VM management program 429 of the VM management server 400A.

The VM management program 429 of the VM management server 400A adds a hypervisor ID to the hypervisor ID field 4231 of the VM table 423A, adds a new VM ID to the VM ID field 4232, adds "POWER-ON" to the status field 4233, and adds a VM group ID to the VM group ID field 4234. The VM management program 429 of the VM management server 400A adds a hypervisor ID to the hypervisor ID field 4271 of the volume mapping table 427A, adds a new VM ID to the VM ID field 4272, and adds volume ID information received from the storage management program 329 to the volume ID 4273.

Subsequently, in step S118, the VM management program 429 of the VM management server 400A transmits a completion notification of the VM generation process to the management terminal 50 of the VM manager.

Through the foregoing process, the new VM 123 with the replication configuration is generated, the new volume 280 is allocated to the VM 123, and the pair of designated VM groups 190 and the pair of CTGs 290 of the allocated volume 280 are set in the current use system and the standby system.

Figure 11:
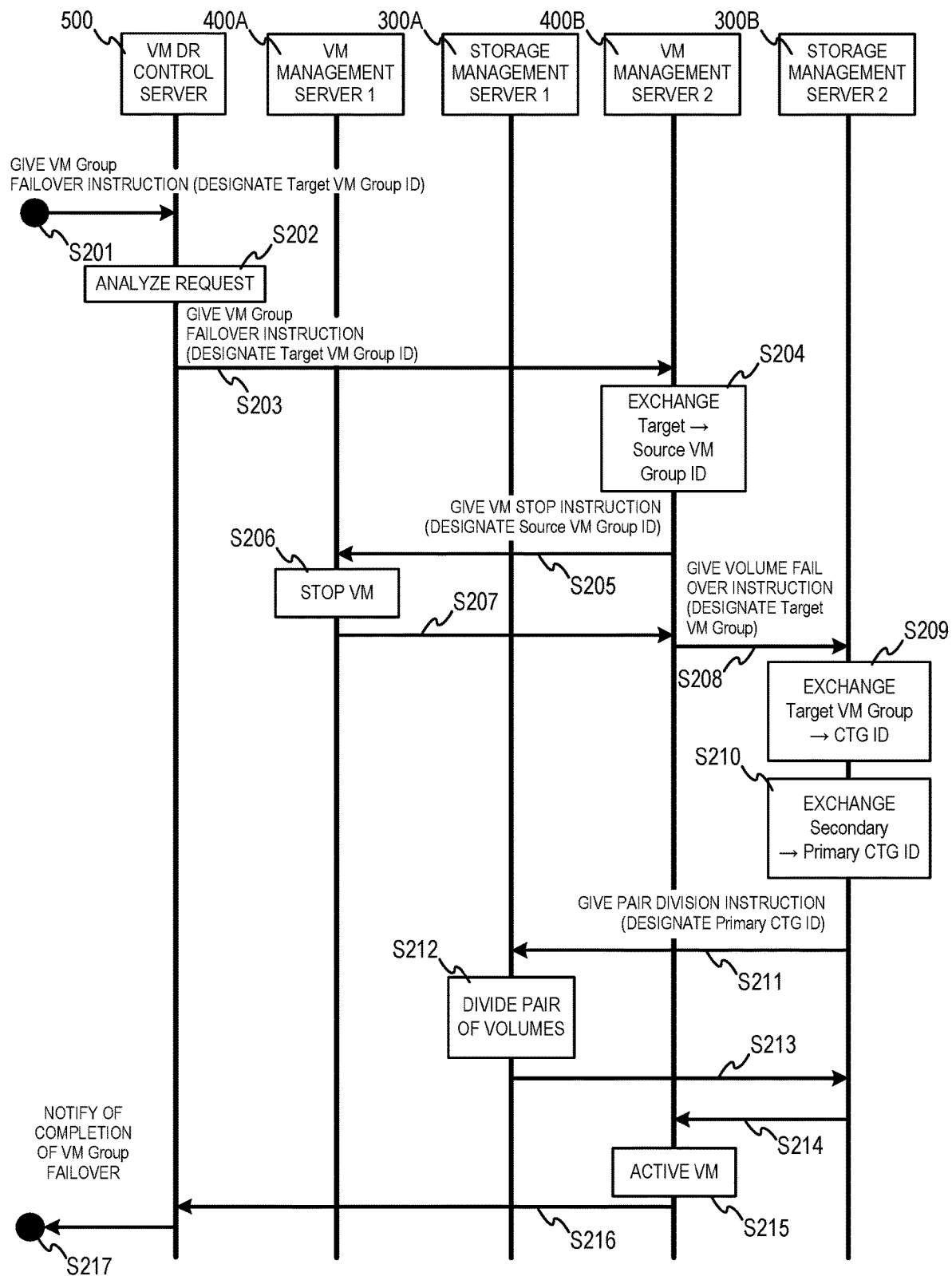
FIG. 11 is a sequence diagram illustrating an example of a process of executing failover of the virtual machines with the replication configuration according to the embodiment of the invention.

FIG. 11 is a sequence diagram illustrating an example of a failover process of the VMs 123 with the replication configuration. An example in which the manager executes the failover in a planed way for maintenance or the like will be described.

First, in step S201, the VM manager instructs the VM DR control program 529 of the VM DR control server 500 to execute failover of the VM 123A with the replication configuration via the management terminal 50. At this time, the VM manager designates the VM group ID of the target VM group 190A which is a failover target.

Subsequently, in step S202, the VM DR control program 529 analyzes the content of the instruction received from the management terminal 50 of the VM manager. The VM DR control program 529 confirms that the information designated in the target VM group ID field 5233 of the VM group pair table 523 is included. The VM DR control program 529 acquires a VM management program ID of the VM management server 400B which is a target (the failover destination) from the target VM management program ID field 5234 in the same row as the confirmed Target VM group ID field 5233.

Subsequently, in step S203, the VM DR control program 529 instructs the VM management program 429 of the VM management server 400B with the VM management program ID acquired in step S202 to execute failover to the VM group 190B. At this time, the VM DR control program 529 designates the VM group ID (for example, the VM group 3; VMGRP 3) of the target VM group 190B.

Subsequently, in step S204, the VM management program 429 of the VM management server 400B receiving the instruction of the failover to the VM group 190B converts the VM group ID of a designated failover destination into a VM group ID of a corresponding remote which is a failover source with reference to the VM group ID field 4251 and the remote VM group ID field 4254 of the VM group pair table 425B. In the case of the embodiment, the VM management server 400B converts "VMGRP3" into "VMGRP1" (VM Group 1) of the remote VM group ID 4254 since the VM group 3 is designated.

Subsequently, in step S205, the VM management program 429 of the VM management server 400B instructs the VM management program 429 of the VM management server 400A of the current use system to stop the VMs 123 in the unit of the VM group 190. At this time, the VM management program 429 of the VM management server 400B designates the VM group ID (the VM group 1 of the failover source) converted in step S204.

Subsequently, in step S206, the VM management program 429 of the VM management server 400A of the current use system specifies the VM IDs of the VMs 123 belonging to the VM group with the VM group ID designated in step S205 with reference to the VM ID field 4232 and the VM group ID 4232 of the VM table 423. Then, the VM management program 429 of the VM management server 400A transmits a request for stopping the VMs (in this example, the VM 1 and the VM 2) with the specified VM IDs to the hypervisor 122A.

The hypervisor 122A stops the VM 123 for which the stop request is given and responds to the VM management program 429 of the VM management server 400A with completion of the VM stop process. The VM management program 429 changes an item related to the stopped VM in the status field 4233 of the VM table 423 to "POWER-OFF."

Subsequently, in step S207, the VM management program 429 of the VM management server 400A transmits a completion notification of the stop of the VMs 123 in the unit of the VM group 190 to the VM management program 429 of the VM management server 400B of the standby system.

Subsequently, in step S208, the VM management program 429 of the VM management server 400B instructs the storage management program 329 of the storage management server 300B to execute volume failover. At this time, the VM management program 429 of the VM management server 400B designates the target VM group ID (in the embodiment, the VM group 3="VMGRP 3").

In step S208 described above, the example in which the VM management server 400A converts the operation on the VM group 190 (the failover of the VMs) into the operation of the volume group (the failover of the volume group) has been described, but the invention is not limited thereto. The storage management server 300 may receive the operation (failover) on the VM group 190 and convert the operation into the operation (failover) on the volume group. The operation may be converted in accordance with a preset table or rule.

In the embodiment, in the conversion of the operation, an operation such as generation, deletion, failover, or movement of the VM group 190 is converted into an operation such as generation, deletion, failover, or movement of the volume group (the CTG 290).

Subsequently, in step S209, the storage management program 329 of the storage management server 300B converts the designated VM group ID into the corresponding CTG ID with reference to the VM group ID field 3232 and the CTG ID field 3234 of the group mapping table 323B. That is, the storage management server 300B converts the parameter "VMGRP 3" of the operation on the VM group 190 into the parameter "CTG 1" of the operation on the volume group (CTG).

Subsequently, in step S210, the storage management program 329 of the storage management server 300B converts the CTG ID acquired in step S209 into the CTG ID of the CTG 290A of the paired storage 1 (200A).

The storage management program 329 of the storage management server 300B transmits a request for acquiring the CTG ID of the pair CTG along with the CTG ID acquired in step S209 to the storage 2 (200B). The storage 2 (200B) acquires the CTG ID of the CTG paired with the CTG with the CTG ID received from the storage management program 329 from the information of the CTG ID field 2241, the remote storage ID field 2243, and the remote CTG ID field 2244 of the consistency group pair table 224 and responds to the storage management program 329 of the storage management server 300B. In the embodiment, the storage management server 300B acquires the CTG 1 of the storage 1 (200A) as a pair of the CTG 1 of the storage 2 (200B).

Subsequently, in step S211, the storage management program 329 of the storage management server 300B instructs the storage management program 329 of the storage management server 300A to execute volume pair division. At this time, the storage management program 329 of the storage management server 300B designates the CTG ID acquired in step S210.

Subsequently, in step S212, the storage management program 329 of the storage management server 300B instructs the storage 1 (200A) to execute the volume pair division.

At this time, the storage management program 329 of the storage management server 300A designates the CTG ID received from the storage management program 329 of the storage management server 300B in step S211.

The storage control program 229 of the storage 1 (200A) executes the pair division process in the CTG unit with the CTG ID designated by the storage management program 239A in cooperation with the storage control program 299 of the storage 2 (200B).

After the pair division process is completed, the storage control program 299 of the storage 1 (200A) specifies the volume ID of the volume registered in the CTG with the designated CTG ID from the information of the volume ID field 2231 and the CTG ID field 2233 of the volume table 223A. Then, the storage control program 299 of the storage 1 (200A) changes the information of the pair status field 2254 in the row matching the volume ID specified with the information of the volume ID field 2251 to "SUSPEND" with reference to the volume ID field 2251 of the volume pair table 225A.

Subsequently, in step S213, the storage management program 329 of the storage management server 300A transmits a completion notification of the volume pair division process to the storage management program 329 of the storage management server 300B which is the failover destination.

Subsequently, in step S214, the storage management program 329 of the storage management server 300B transmits a completion notification of the volume failover process to the VM management program 429 of the VM management server 400B.

Subsequently, in step S215, the VM management program 429 of the VM management server 400B specifies the VM IDs of the VMs 123 belonging to the VM group with the VM group ID designated from the VM DR control server 500 with reference to the VM ID field 4232 and the VM group ID 4232 of the VM table 423B.

Then, the VM management program 429 of the VM management server 400B transmits a request for activating the VMs 123 with the specified VM IDs to the hypervisor 122B. The hypervisor 122B activates the VMs 123 for which the activation request is received and responds to the VM management program 429 with completion of the VM activation process. The VM management program 429 of the VM management server 400B changes an item related to the activated VMs 123 in the status field 4233 of the VM table 423B to "POWER-ON."

Subsequently, in step S216, the VM management program 429 of the VM management server 400B transmits a completion notification of the failover process in the unit of the VM group 190 to the VM DR control program 529.

Subsequently, in step S217, the VM DR control program 529 transmits a completion notification of the failover of the VM group 190 to the management terminal 50 of the VM manager.

Through the foregoing process, the VM group 1 of the host 100A fails over to the VM group 3 of the host 100B, and the CTG 1 of the storage 1 (200A) corresponding to the VM group 1 fails over to the CTG 1 of the storage 2 (200B).

Thus, changes in the configurations of the DR of the VMs 123 and the DR of the storages 200 can be interlocked. Therefore, in the computer system in which the disks of the VMs 123 and the volumes 280 of the storages 200 are one-to-one, it is possible to realize the DR operation in which consistency of the data is maintained in the unit of the group (190) of the VMs 123.

Figure 12:
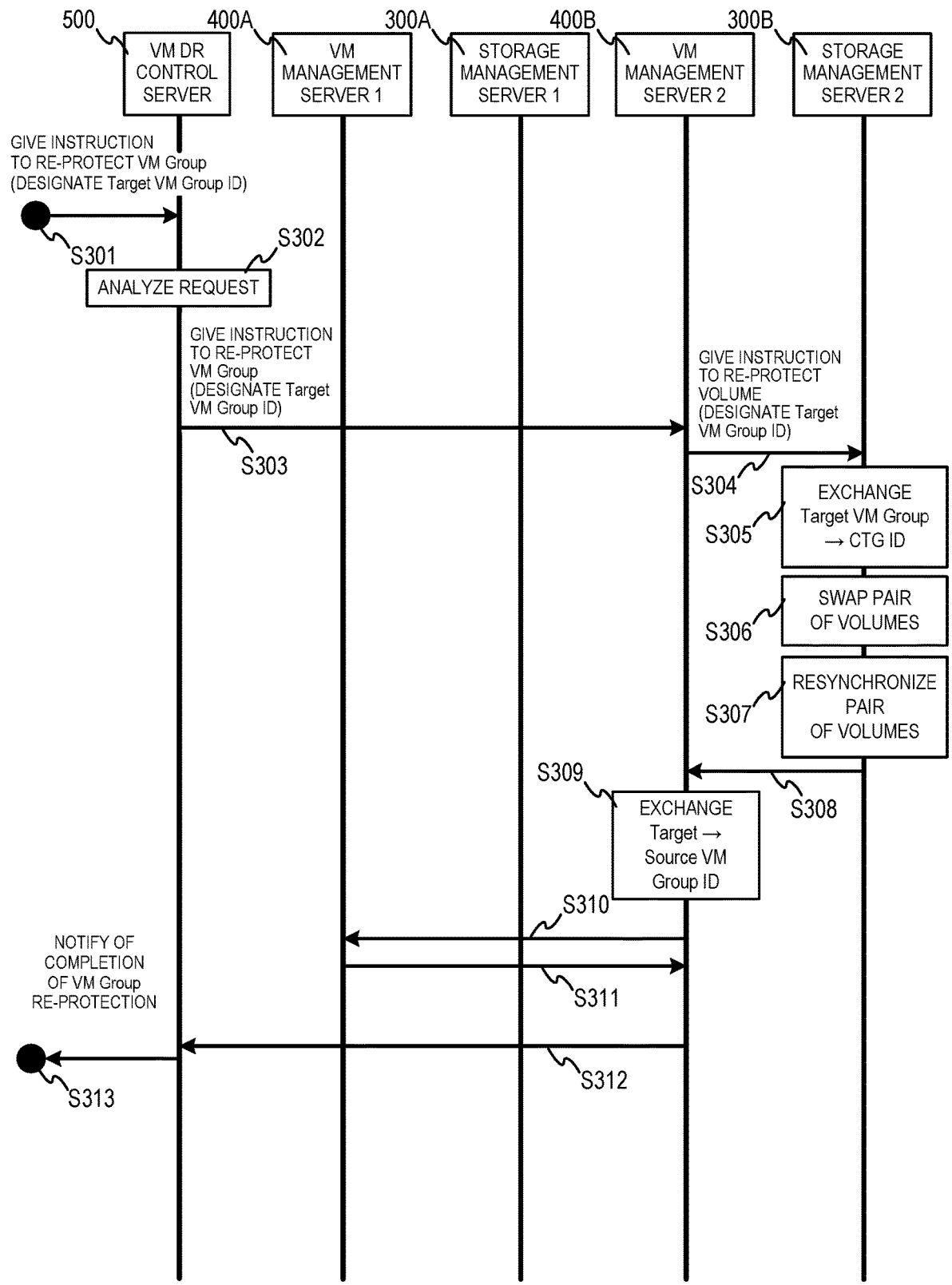
FIG. 12 is a sequence diagram illustrating an example of a process of executing re-protection of the virtual machines with the replication configuration according to the embodiment of the invention.

FIG. 12 is a sequence diagram illustrating an example of a re-protection process of the VMs 123 with the replication configuration. This process is executed, for example, when the failover of FIG. 11 is completed.

First, in step S301, the VM manager instructs the VM DR control program 529 of the VM DR control server 500 to re-protect the VMs of the replication configuration via the management terminal 50. At this time, the management terminal 50 of the VM manager designates a VM group ID of the target VM group 190 of a re-protection target. In the following example, an example in which the VM group 3 for which the failover is completed in FIG. 11 is re-protected will be described.

Subsequently, in step S302, the VM DR control program 529 of the VM DR control server 500 analyzes instruction content received from the management terminal 50 of the VM manager. The VM DR control program 529 confirms that information designated in the target VM group ID field 5233 of the VM group pair table 523 is included. The VM DR control program 529 acquires the VM management program ID of the target VM management program 429 from the target VM management program ID field 5234 in the same row as the confirmed target VM group ID field 5233.

Subsequently, in step S303, the VM DR control program 529 instructs the VM management program with the VM management program ID acquired in step S302 (herein, the VM management program 429 of the VM management server 400B) to re-protect the VM group 190B. At this time, the VM DR control program 529 designates the VM group ID of the target VM group 190. In the embodiment, a case in which the VM group 3 is designated will be described.

Subsequently, in step S304, the VM management program 429 of the VM management server 400B instructs the storage management program 329 of the storage management server 300B to re-protect the volumes. At this time, the VM management program 429 of the VM management server 400B designates the target VM group ID.

In Step S304 described above, the example in which the VM management server 400B converts the operation on the VM group 190 (re-protecting the VMs) into the operation on the volume group (re-protecting the volume group) has been described, but the invention is not limited thereto. The storage management server 300 may receive the operation on the VM group 190 (re-protection) and convert the operation into the operation on the volume group (re-protection).

Subsequently, in step S305, the storage management program 329 of the storage management server 300B converts the designated VM group ID into the corresponding CTG ID with reference to the VM group ID field 3232 and the CTG ID field 3234 of the group mapping table 323B. In the embodiment, the CTG 1 can be obtained from the VM group 3.

Subsequently, in step S306, the storage management program 329 of the storage management server 300B instructs the storage 2 (200B) to execute volume pair swapping. At this time, the storage management program 329 designates the CTG ID acquired in step S305.

The storage control program 229 of the storage 2 (200B) executes the volume pair swapping process in the CTG unit with the CTG ID designated by the storage management program 239 of the storage management server 300B in cooperation with the storage control program 299 of the storage 1 (200A).

After the volume pair swapping process is completed, the storage control program 229 of the storage 2 (200B) specifies the volume ID of the volume 280B registered in the CTG with the designated CTG ID from the information of the volume ID field 2231 and the CTG ID field 2233 of the volume table 223B.

Then, the storage control program 229 of the storage 2 (200B) changes the information of the PVOL/SVOL field in the row matching the volume ID specified with the information of the volume ID field 2251 from "PVOL" to "SVOL" or from "SVOL" to "PVOL" and changes the information of the pair status field 2254 to "SUSPEND" with reference to the volume ID field 2251 of the volume pair table 225B.

Further, the storage control program 229 of the storage 2 (200B) changes the information of the Primary/Secondary field in the row matching the CTG ID designated with the information of the CTG ID field 2241 from "Primary" to "Secondary" or from "Secondary" to "Primary" with reference to the CTG ID field 2241 of the consistency group pair table 224B.

Subsequently, in step S307, the storage management program 329 of the storage management server 300B instructs the storage 2 (200B) to resynchronize the pair of volumes. At this time, the storage management program 329 designates the CTG ID acquired in step S305.

The storage control program 229 of the storage 2 (200B) executes a process of resynchronizing the pair of volumes in the CTG unit with the CTG ID designated by the storage management program 239 of the storage management server 300B in cooperation with the storage control program 299 of the storage 1 (200A).

After the process of resynchronizing the pair of volumes is completed, the storage control program 229 of the storage 2 (200B) specifies the volume ID of the volume 280B registered in the CTG with the designated CTG ID from the information of the volume ID field 2231 and the CTG ID field 2233 of the volume table 223B.

Then, the storage control program 299 of the storage 2 (200B) changes the information of the pair status field 2254 in the row matching the volume ID specified with the information of the volume ID field 2251 to "SYNC" with reference to the volume ID field 2251 of the volume pair table 225B.

Subsequently, in step S308, the storage management program 329 of the storage management server 300B transmits a completion notification of the volume re-protection process to the VM management program 429 of the VM management server 400B. The VM management program 429 of the VM management server 400B changes the Source/Target field 4252 in the row matching the designated VM group ID to "SOURCE" from the VM group ID field 4251 of the VM group pair table 425B.

Subsequently, in step S309, the VM management program 429 of the VM management server 400B converts the designated VM group ID to the corresponding remote VM group ID with reference to the VM group ID field 4251 and the remote VM group ID field 4254 of the VM group pair table 425B.

Subsequently, in step S310, the VM management program 429 of the VM management server 400B transmits the VM group ID acquired in step S309 and a request for updating the VM group pair table to the VM management program 429 of the VM management server 400A.

The VM management program 429 of the VM management server 400A changes the Source/Target field 4252 in the row matching the designated VM group ID to "TARGET" from the VM group ID field 4251 of the VM group pair table 425A.

Subsequently, in step S311, the VM management program 429 of the VM management server 400A transmits a completion notification of the VM group pair table update process to the VM management program 429 of the VM management server 400B.

Subsequently, in step S312, the VM management program 429 of the VM management server 400B transmits a completion notification of the re-protection of the VM group 190 to the VM DR control program 529.

The VM DR control program 529 specifies a row matching the VM group ID with which the re-protection is executed from the information of the target VM group ID field 5233 of the VM group pair table 523. The VM DR control program 529 exchanges and updates the information of the Source VM group ID field 5231 and the Target VM group ID 5233 in the specified row, and the Source VM management program ID field 5232 and the Target VM management program ID field 5234.

Subsequently, in step S313, the VM DR control program 529 transmits a completion notification of the re-protection of the VM group 190 to the management terminal 50 of the VM manager.

Through the foregoing process, the CTG 1 (290B) of the storage 2 (200B) executing the failover can configure a pair of volumes with the CTG 1 of the storage 1 (200A) so that redundancy can be ensured.

Figure 13:
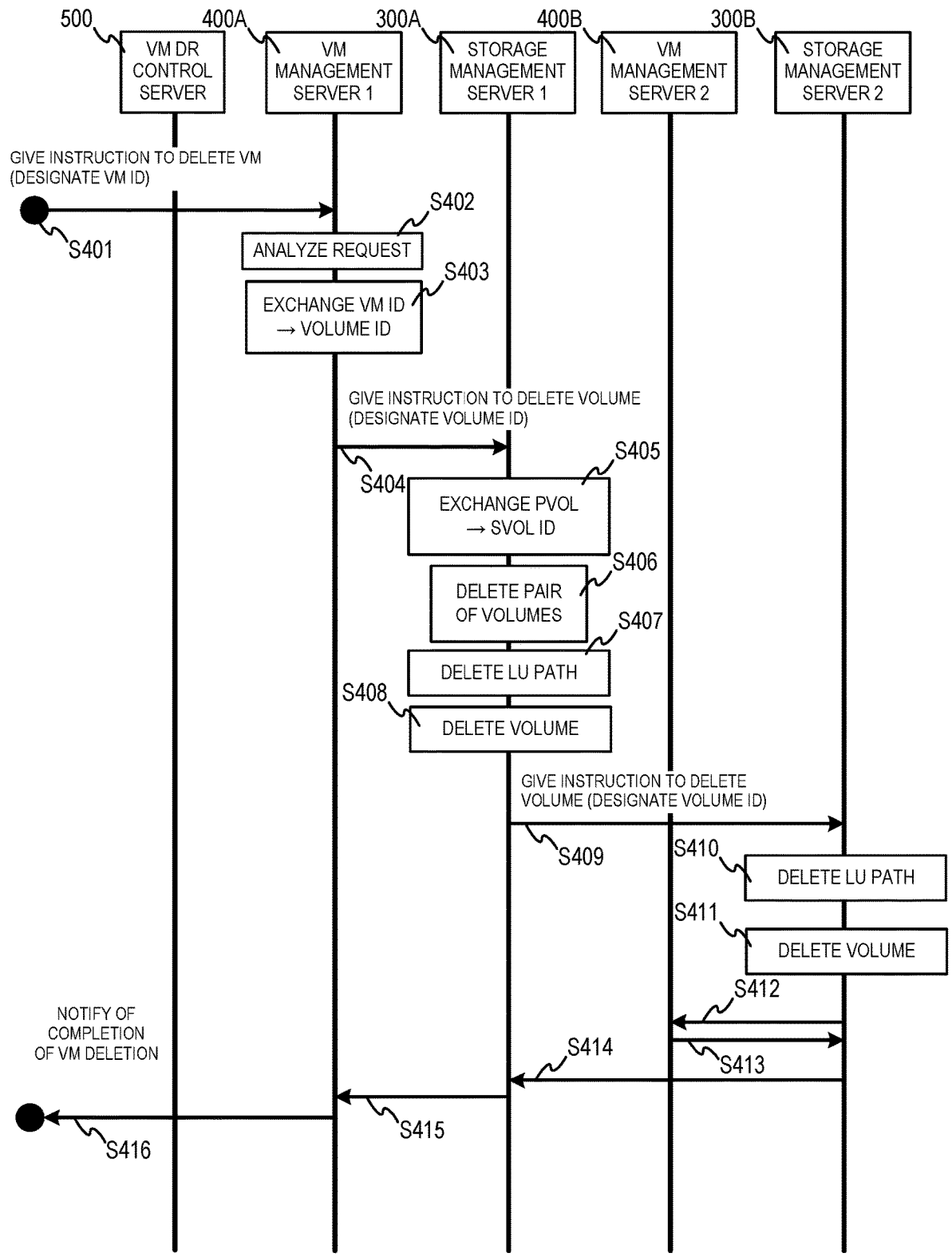
FIG. 13 is a sequence diagram illustrating an example of a process of deleting the virtual machines with the replication configuration according to the embodiment of the invention.

FIG. 13 is a sequence diagram illustrating an example of a process of deleting the VMs 123 with the replication configuration.

First, in step S401, the VM manager instructs the VM management program 429 of the VM management server 400A to delete the VMs 123 with the replication configuration via the management terminal 50. At this time, the management terminal 50 of the VM manager designates the VM IDs of the deletion target VMs 123.

Subsequently, in step S402, the VM management program 429 of the VM management server 400A analyzes instruction content received from the management terminal 50 of the VM manager. The VM management program 429 of the VM management server 400A confirms that the information designated with the VM ID field 4232 of the VM table 423A is included.

Subsequently, in step S403, the VM management program 429 of the VM management server 400A acquires the volume ID corresponding to the designated VM ID from the VM-volume mapping table 427A.

Subsequently, in step S404, the VM management program 429 of the VM management server 400A instructs the storage management program 329 of the storage management server 300A to delete the volume 280A. At this time, the VM management program 429 designates the volume ID acquired in step S403.

In step S404 described above, the example in which the VM management server 400A converts the operation on the VM group 190 (deleting the VMs) into the operation on the volume group (deleting the volume group) has been described, but the invention is not limited thereto. The storage management server 300 may receive an operation on the VM group 190 (deletion) and convert the operation into the deletion of the volume group.

Subsequently, in step S405, the storage management program 329 of the storage management server 300A acquires the volume ID of the volume 280B paired with the volume with the designated ID from the volume pair table 225A and the designated volume ID.

Subsequently, in step S406, the storage management program 329 of the storage management server 300A instructs the storage 1 (200A) to delete the pair of volumes. At this time, the storage management program 329 designates the volume ID designated in step S404 and the volume ID acquired in step S405.

The storage control program 229 of the storage 1 (200A) executes the pair deletion process between the volumes with the volume ID designated by the storage management program 239 of the storage management server 300A in cooperation with the storage control program 299 of the storage 2 (200B). After the pair deletion process starts, the storage control program 299 of the storage management server 300A deletes the information of the pair deletion target of the volume pair table 255A.

Subsequently, in step S407, the storage management program 329 of the storage management server 300A instructs the storage 1 (200A) to delete the LU path of the volume 280A for which the pair deletion is completed.

Subsequently, in step S408, the storage management program 329 of the storage management server 300A instructs the storage 1 (200A) to delete the volume 280A. After the process is completed, the storage management program 329 of the storage management server 300A deletes the information of the deletion target volume of the volume table 223A.

Subsequently, in step S409, the storage management program 329 of the storage management server 300A instructs the storage management program 329 of the storage management server 300B to delete the volume 280B. At this time, the storage management program 392 of the storage management server 300A designates the volume ID acquired in step S405.

Subsequently, in step S410, the storage management program 329 of the storage management server 300B instructs the storage 2 (200B) to delete the LU path of the volume 280B for which the pair deletion is completed.

Subsequently, in step S411, the storage management program 329 of the storage management server 300B instructs the storage 2 (200B) to delete the volume 280B. After the process is completed, the storage management program 329 of the storage management server 300B deletes the information of the deletion target volume of the volume table 223B.

Subsequently, in step S412, the storage management program 329 of the storage management server 300B transmits, to the VM management program 429 of the VM management server 400B, an instruction to delete the volume 280B for which the deletion is completed and the information of the VM 123B connected to the volume 280B from the VM table 423B and the VM-volume mapping table 427B. The VM management program 429 of the VM management server 400B deletes the information of the designated VM 123B and the volume 280B from the VM table 423B and the VM-volume mapping table 427B.

Subsequently, in step S413, the VM management program 429 of the VM management server 400B notifies the storage management program 329 of the storage management server 300B of completion of the process requested in step S412.

Subsequently, in step S414, the storage management program 329 of the storage management server 300B transmits a completion notification of the volume deletion process to the storage management program 329 of the storage management server 300A.

Subsequently, in step S415, the storage management program 329 of the storage management server 300A transmits the completion notification of the volume deletion to the VM management program 429 of the VM management server 400A. The VM management program 429 of the VM management server 400A deletes the information of the volume 280A for which the deletion is completed and the VM 123A connected to the volume 280A from the VM table 423A and the VM-volume mapping table 427A.

Subsequently, in step S416, the VM management program 429 of the VM management server 400A transmits a completion notification of the VM generation to the management terminal 50 of the VM manager.

Through the foregoing process, when the VM 123A of the current use system is deleted, the resources of the storage 1 (200A) and the storage 2 (200B) can be released with regard to the volume 280A connected to the VM 123A and the volume 280B of the standby system paired with the volume 280A.

As described above, when the operation (failover) on the resource of the VM is received, the VM management server 400 converts the operation on the VM resource (the VM group 190) into the operation on the resource (the volume group) of the storage (the failover of the volume group) and notifies the storage management server 300 of the operation.

The storage management server 300 can realize the failover of the volume by converting the parameter (the ID of the VM group 190) of the resource operation of the VMs into the parameter (the CTG ID) of the resource operation of the storage 200 in accordance with the group mapping table 323 and the consistency group pair table 224.

Thus, it is possible to realize the replication operation in the unit of the volume group (the CTG 290) while maintaining the consistency of the data between the volumes in the VM group 190.

In the foregoing embodiment, the VM management server 400 has converted the operation on the resource of the VMs into the operation on the resources of the storage 200. However, as described above, the storage management server 300 can receive an operation on the resources of the VMs and convert the operation into an operation on the resources of the storage 200.

Thus, the storage management server 300 can convert the operation and the parameters (for example, the identifiers of the VM groups of the movement source and the movement destination) for the resources of the VMs (or the VM group 190) into the operation and the parameters (for example, the identifiers of the volume groups of the movement source and the movement destination) for the resources of the storage 200. In this case, when the storage management server 300 receives the operation and the parameters for the resources of the VMs, the storage management server 300 can convert the operation and the parameters into the operation and the parameters for the resources of the storage 200. Therefore, it is possible to provide the storage management server 300 appropriate for management of the VMs 123 (or the VM group 190).

In the foregoing embodiment, the example in which the VM management server 400 instructs the storage management server 300 to execute the failover (or movement) of the volume group (the CTG 290) has been described, but the VM DR control server 500 may notify the storage management server 300 of the operation and the parameters for the resources of the VMs and the storage management server 300 may execute the conversion to the failover of the volume group.

The invention is not limited to the foregoing embodiment and includes various modification examples. For example, the foregoing embodiment has been described in detail to facilitate the invention and the invention is not necessarily limited to the inclusion of all the described configurations. Some of the configurations of a certain embodiment can be substituted with configurations of another embodiment and configurations of a certain configuration can also be added to configurations of another embodiment. All of the additions, deletions, and substitutions of other configurations may be applied solely or in combination to some of the configurations of each embodiment.

Some or all of the foregoing configurations, functions, processing units, processing means, and the like may be realized with hardware, for example, by designing an integrated circuit. The foregoing configurations, functions, and the like may be realized by software, for example, by causing a processor to analyze a program realizing each function. Information of the table, the file, the program, and the like realizing each function can be recorded on a recording device such as a memory, a hard disk, or a solid status drive (SSD) or a recording medium such as an IC card, an SD card, or a DVD.

A control line or an information line indicates that necessity for description is considered, and thus all the control lines or information lines in a product may not be indicated. In practice, most of all the configurations may be considered to be connected to each other.

The invention claimed is:

1. A storage management server comprising a memory storing management information and a management program and a processor executing the management program with reference to the management information, wherein the storage management server manages a storage resource allocated to a server resource, wherein the management information includes group mapping information for converting a first parameter of the server resource into a second parameter of the storage resource in association with the first parameter for specifying the server resource and the second parameter for specifying the storage resource, the processor receives an operation on the server resource and the first parameter and converts the operation on the server resource into an operation on the storage resource based on preset information, the processor converts the first parameter of the server resource into the second parameter of the storage resource with reference to the group mapping information, specifies the storage resource included in the second parameter, and gives an instruction to operate the storage resource, the first parameter includes an identifier of a group of virtual machines, the identifier of the group of the virtual machines is associated with an identifier of the one or more virtual machines, the second parameter includes an identifier of a group of volumes allocated to the group of the virtual machines, the identifier of the group of the volumes is associated with the identifier of the one or more volumes, and the group mapping information defines a relation between the first parameter and the second parameter.

2. The storage management server according to claim 1, wherein the storage management server includes a first storage management server of a current use system and a second storage management server of a standby system, and when the first storage management server receives the first parameter of the server resource and addition of a virtual machine as the operation on the server resource, the first storage management server converts the operation of adding the virtual machine to the server resource into an operation of adding a volume to the storage resource based on the preset information, and the first storage management server converts the first parameter into the second parameter based on the group mapping information, specifies a specified storage resource corresponding to the second parameter, gives an instruction to add the volume to the specified storage resource, specifies the second parameter of the standby system corresponding to the second parameter of the current use system based on preset pair information, and transmits the specified second parameter of the standby system and an instruction to add the volume to the second storage management server.

3. The storage management server according to claim 2, wherein when the second storage management server receives the second parameter and the instruction to add the volume from the first storage management server, the second storage management server specifies the storage resource corresponding to the second parameter and gives an instruction to add the volume to the specified storage resource.

4. The storage management server according to claim 1, wherein the storage management server includes a first storage management server of a current use system and a second storage management server of a standby system, and when the second storage management server receives the first parameter of the server resource and failover as an operation on the server resource, the second storage management server converts the operation on the server resource into failover of a volume as the operation on the storage resource, and the second storage management server converts the first parameter into the second parameter based on the group mapping information, specifies the second parameter of the current use system corresponding to the second parameter of the standby system based on preset pair information, and transmits the specified second parameter of the current use system and an instruction to divide pairing with the specified second parameter of the current use system to the first storage management server.

5. A method of controlling a storage management server including a processor and a memory, the method comprising:

a first step of setting group mapping information for mutually converting a first parameter of a server resource and a second parameter of a storage resource in association with the first parameter allocated to a group of server resources and a second identifier allocated to a group of storage resources by the storage management server;

a second step of receiving an operation on the server resource and the first parameter by the storage management server;

a third step of converting the first parameter of the server resource into the second parameter of the storage resource with reference to the group mapping information by the storage management server; and a fourth step of specifying the storage resource included in the converted second parameter and giving the instruction of the operation by the storage management server, wherein the first parameter includes an identifier of a group of virtual machines, the identifier of the group of the virtual machines is associated with an identifier of the one or more virtual machines, the second parameter includes an identifier of a group of volumes allocated to the group of the virtual machines, the identifier of the group of the volumes is associated with the identifier of the one or more volumes, and the group mapping information defines a relation between the first parameter and the second parameter.

6. The method of controlling the storage management server according to claim 5, wherein the storage management server includes a first storage management server of a current use system and a second storage management server of a standby system, and in the second step, the first storage management server receives the first parameter of the server resource and addition of a volume as the operation on the server resource, in the third step, the first storage management server converts the first parameter into the second parameter based on the group mapping information, and in the fourth step, the first storage management server specifies a specified storage resource corresponding to the second parameter, gives an instruction to add the volume to the specified storage resource, specifies the second parameter of the standby system corresponding to the second parameter of the current use system based on preset pair information, and transmits the specified second parameter of the standby system and an instruction to add the volume to the second storage management server.

7. The method of controlling the storage management server according to claim 6, further comprising:

a fifth step of receiving the second parameter and the instruction to add the volume from the first storage management server by the second storage management server; and a sixth step of specifying the storage resource corresponding to the second parameter and giving an instruction to add the volume to the specified storage resource by the second storage management server.

8. The method of controlling the storage management server according to claim 5, wherein the storage management server includes a first storage management server of a current use system and a second storage management server of a standby system, and in the second step, the second storage management server receives the first parameter of the server resource and failover as an operation on the server resource, in the third step, the second storage management server converts the first parameter into the second parameter based on the group mapping information, and in the fourth step, the second storage management server specifies the second parameter of the current use system corresponding to the second parameter of the standby system based on preset pair information, and transmits the specified second parameter of the current use system and an instruction to divide pairing with the specified second parameter of the current use system to the first storage management server.

9. A computer system comprising a storage management server that includes a memory storing management information and a management program and a processor executing the management program with reference to the management information, and a storage device that includes a storage resource allocated to a server resource, wherein the management information of the storage management server includes group mapping information for converting a first parameter of the server resource into a second parameter of the storage resource in association with the first parameter for specifying the server resource and the second parameter for specifying the storage resource, the processor of the storage management server:
receives the first parameter of the server resource and an operation on the server resource,
converts an operation of adding a virtual machine to the server resource into an operation of adding a volume to the storage resource based on preset information, and
converts the first parameter into the second parameter of the storage resource corresponding to the first parameter of the server resource with reference to the group mapping information, specifies the storage device of the storage resource included in the second parameter, and gives the operation to the storage device, and the first parameter includes an identifier of a group of virtual machines, the identifier of the group of the virtual machines is associated with an identifier of the one or more virtual machines, the second parameter includes an identifier of a group of volumes allocated to the group of the virtual machines, the identifier of the group of the volumes is associated with the identifier of the one or more volumes, and the group mapping information defines a relation between the first parameter and the second parameter.

10. The computer system according to claim 9, wherein
the storage management server includes a first storage management server of a current use system and a second storage management server of a standby system, and when the first storage management server receives the first parameter of the server resource and addition of a virtual machine as the operation on the server resource, the first storage management server converts the operation of adding the virtual machine to the server resource into an operation of adding a volume to the storage resource based on the preset information, and the first storage management server converts the first parameter into the second parameter based on the group mapping information, specifies a specified storage resource corresponding to the second parameter, gives an instruction to add the volume to the storage device of the specified storage resource, specifies the second parameter of the standby system corresponding to the second parameter of the current use system based on pair information set in the storage device, and transmits the specified second parameter of the standby system and an instruction to add the volume to the second storage management server.

11. The computer system according to claim 10, wherein
when the second parameter and the instruction to add the volume are received from the first storage management server, the second storage management server specifies the storage resource corresponding to the second parameter and instructs the storage device to add the volume to the specified storage resource.

12. The computer system according to claim 9, wherein
the storage management server includes a first storage management server of a current use system and a second storage management server of a standby system, and when the second storage management server receives the first parameter of a server resource of a failover destination and failover as an operation on the server resource, the second storage management server converts the first parameter into the second parameter based on the group mapping information, acquires the second parameter of the current use system corresponding to the second parameter of the standby system based on pair information preset in the storage device corresponding to the second parameter, and transmits the acquired second parameter of the current use system and an instruction to divide pairing with the acquired second parameter of the current use system to the first storage management server.

* * * * *